US012323466B1

(12) United States Patent
Miseiko et al.

(10) Patent No.: US 12,323,466 B1
(45) Date of Patent: Jun. 3, 2025

(54) POLICY EXCEPTIONS FOR ASSESSMENT OF NETWORK SYSTEM ASSETS

(71) Applicant: Rapid7, Inc., Boston, MA (US)

(72) Inventors: Paul Miseiko, Mississauga (CA); Leonardo Varela, Austin, TX (US)

(73) Assignee: Rapid7, Inc., Boston, MA (US)

( * ) Notice: Subject to any disclaimer, the term of this patent is extended or adjusted under 35 U.S.C. 154(b) by 145 days.

(21) Appl. No.: 17/808,079

(22) Filed: Jun. 21, 2022

(51) Int. Cl.
| | |
|---|---|
| *H04L 9/40* | (2022.01) |
| *G06F 21/56* | (2013.01) |
| *G06F 21/57* | (2013.01) |
| *H04L 9/00* | (2022.01) |
| *H04L 9/08* | (2006.01) |
| *H04L 9/32* | (2006.01) |

(52) U.S. Cl.
CPC ............ *H04L 63/20* (2013.01); *H04L 63/166* (2013.01); *G06F 21/568* (2013.01); *G06F 21/577* (2013.01); *H04L 63/1408* (2013.01); *H04L 63/1416* (2013.01); *H04L 63/1433* (2013.01)

(58) Field of Classification Search
CPC ... H04L 63/20; H04L 63/166; H04L 63/1408; H04L 63/1416; H04L 63/1433; G06F 21/568; G06F 21/577
See application file for complete search history.

(56) References Cited

U.S. PATENT DOCUMENTS

| | | | |
|---|---|---|---|
| 7,609,650 B2 | 10/2009 | Roskowski et al. | |
| 7,926,113 B1* | 4/2011 | Gula | H04L 63/1425 726/25 |
| 8,955,038 B2 | 2/2015 | Nicodemus et al. | |
| 9,503,472 B2 | 11/2016 | Laidlaw et al. | |
| 9,634,951 B1 | 4/2017 | Hunt et al. | |
| 9,954,883 B2* | 4/2018 | Ahuja | H04L 63/1433 |
| 11,216,553 B1* | 1/2022 | Cancilla | H04L 9/0894 |
| 2014/0013436 A1* | 1/2014 | Deraison | H04L 63/1433 726/25 |
| 2016/0044057 A1 | 2/2016 | Chenette et al. | |

OTHER PUBLICATIONS

"How to Create an OS-Based Policy Scanning Workflow in Insight VM"—Landon Dalke, Rapid 7, Dec. 4, 2020 https://www.rapid7.com/blog/post/2020/12/04/how-to-create-an-os-based-policy-scanning-workflow-in-insightvm/ (Year: 2020).*

"Bypass Vulnerability Management Scan Traffic in Deep Security"— Deep Security Help Center, Trend Micro, Aug. 25, 2020 https://help.deepsecurity.trendmicro.com/10_1/aws/vulnerability-traffic-bypass.html (Year: 2020).*

* cited by examiner

*Primary Examiner* — Randy A Scott

(74) *Attorney, Agent, or Firm* — Ashwin Anand; Lei Sun

(57) ABSTRACT

A method for authenticated asset assessment is provided. The method involves executing a scan assistant on an asset to allow a remote scan engine to execute one or more scan operations on the asset for determining a state of the asset. The scan assistant may verify the identity of the scan engine by checking that a certificate received from the scan engine is signed with a private key associated with the scan engine. In some embodiments, the authentication may be performed as part of a TLS handshake process that establishes a TLS connection between the scan engine and the scan assistant. Once the scan engine is authenticated, the scan engine may communicate with the scan assistant according to a communication protocol to collect data about the asset. Advantageously, the disclosed technique reduces security risks associated with authenticated scans and improves the performance of authenticated scans.

20 Claims, 17 Drawing Sheets

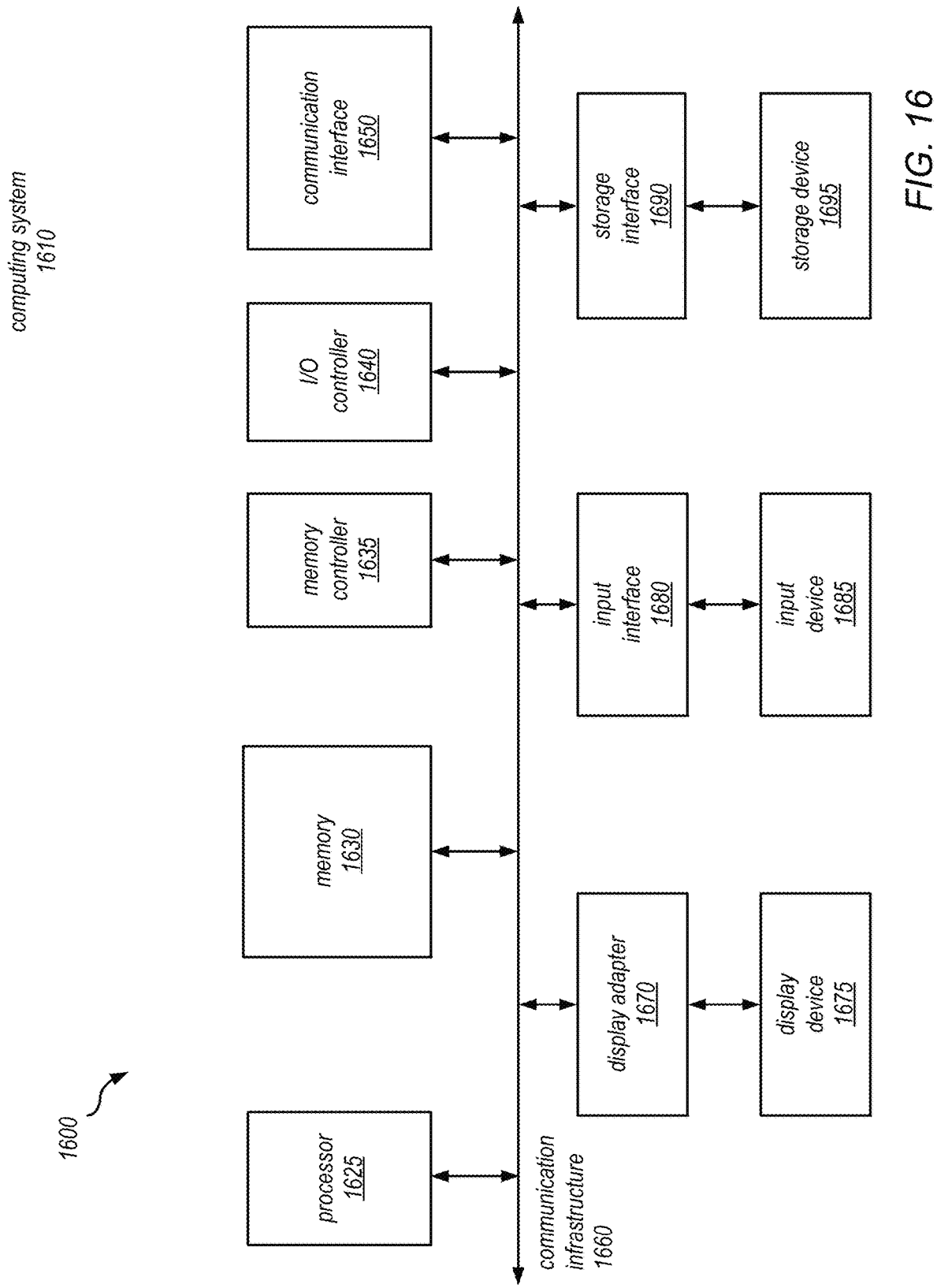

POLICY EXCEPTIONS FOR ASSESSMENT OF NETWORK SYSTEM ASSETS

TECHNICAL FIELD

This disclosure is related to network computing systems. In particular, this disclosure is related to assessing assets of a network computing system.

BACKGROUND

Authenticated scans provide insight into the state of an asset on a network system. These scans may require an owner of the network to create, manage, and distribute credentials in order to implement and use these scans. This may create network challenges and may often require integration with third-party credential services. For example, authenticated scan credentials may require administrative (e.g., WINDOWS®)/root (e.g., UNIX®) access to effectively authenticate a scan and thereby complicate acceptance to deploy credentials.

In some aspects, remote execution of commands on an asset of a network system to perform assessment of that asset may require authentication of a remote device. WinRM® on WINDOWS®, OpenSSH® on UNIX®, and similar systems may be used to achieve remote access. However, if a credential used by a remote device for authenticated access becomes compromised, the credential may be used to provide or obtain unfettered access to the asset.

In some aspects, policy scans may use administrative credentials to remotely authenticate with several network services running on an asset of a network system. Policy benchmarks may require that remote access of any kind is not allowed, remote access with administrative credentials is not allowed, or network services required for policy scanning must not be running. To avoid this issue, a network system entity (e.g., a network system owner or a network system non-owner that is responsible for asset management) may implement exceptions to their policy assessment results that override a non-compliant status of a policy test that conflicts with policy scanning requirements. As a result, a network system entity may be left temporarily non-compliant, if the network system entity overrides the non-compliant status prior to scanning or the network system entity may be left permanently non-compliant if the network system entity keeps their assets configured with an exception. In many cases, having an asset in a non-compliant state increases the risk of compromising an asset or the network system.

SUMMARY OF EMBODIMENTS

Disclosed herein are methods, systems, and apparatuses for implementing authenticated assessment of a network system asset. Embodiments described herein utilize a scan assistant implemented with an asset of a network system to authenticate a scan engine for performing a scan assessment of the asset. The scan assistant may allow network system owners to authenticate a scan engine on a device without using credentials from third-party credential management software and bypassing network system owner concerns when creating an administrative level credential or a root level credential for remote access. In some aspects, the scan assistant may require two credentials for a remote device to remotely execute commands on an asset of a network system. Additionally, or alternatively, the scan assistant may bypass the need for policy exceptions to overcome policy benchmarks for remote authentication to perform a scan assessment on an asset of a network system.

BRIEF DESCRIPTION OF THE DRAWINGS

FIG. 16 is a block diagram of a computing system that may be used to implement one or more portions of a system for performing asset assessment according to some aspects.

Figure 1:
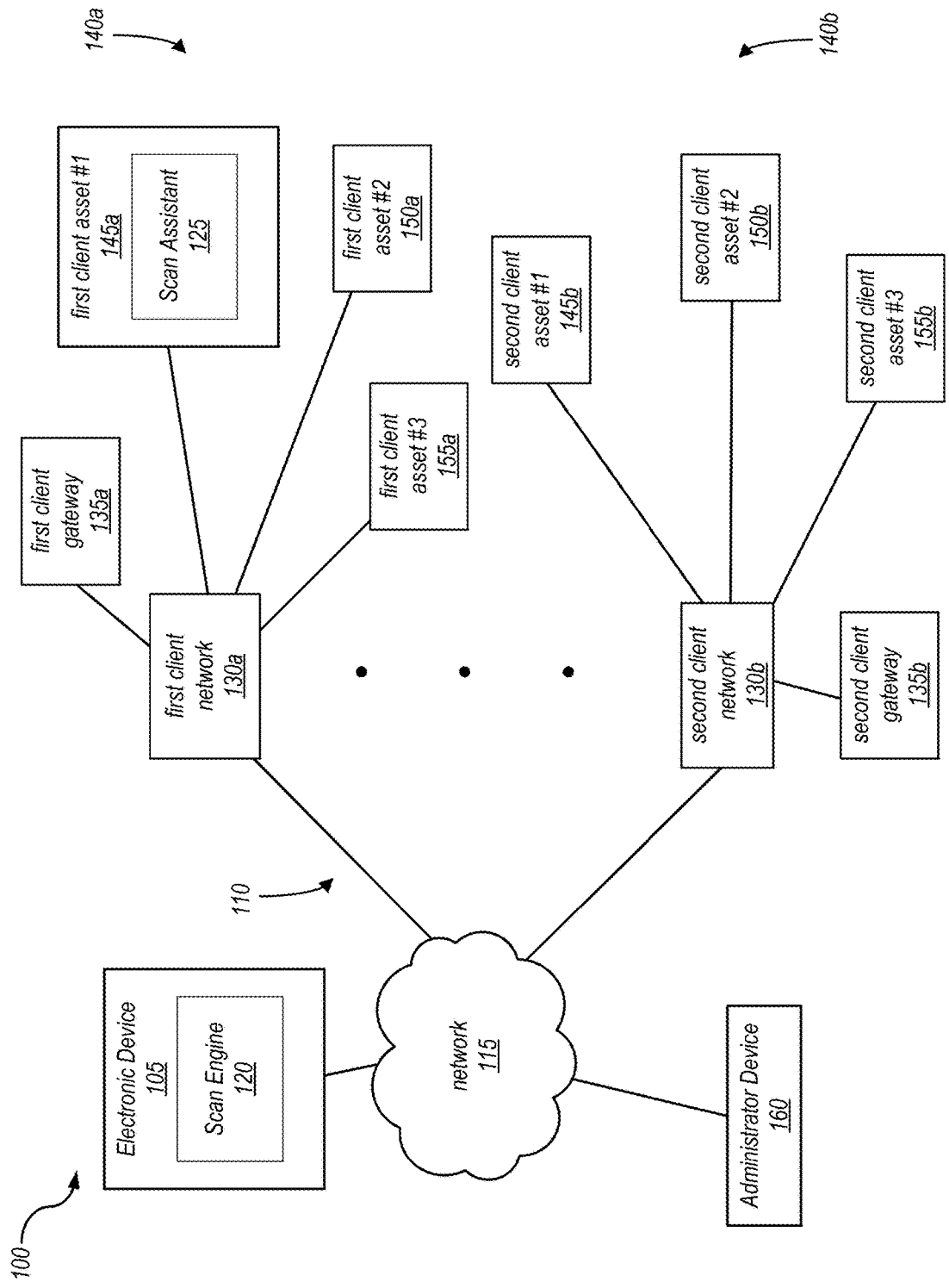
FIG. 1 illustrates an example diagram of a scan engine and a customer asset according to some aspects.

While the disclosure is open to various modifications and alternative implementations, specific embodiments of the disclosure are provided as examples in the drawings and detailed description. It should be understood that the drawings and detailed description are not intended to limit the disclosure to the particular form disclosed.

DETAILED DESCRIPTION

Authenticated scans provide insight into the state of an asset on a network system. These scans may require an owner of the network to create, manage, and distribute credentials in order to implement and use these scans. This may create network challenges and may often require integration with third-party credential services. For example, authenticated scan credentials may require administrative (e.g., WINDOWS®)/root (e.g., UNIX®) access to effectively authenticate a scan and thereby complicate acceptance to deploy credentials.

In some aspects, remote execution of commands on an asset of a network system to perform assessment of that asset may require authentication of a remote device. WinRM® on WINDOWS®, OpenSSH® on UNIX®, and similar systems may be used to achieve remote access. However, if a credential used by a remote device for authenticated access becomes compromised, the credential may be used to provide or obtain unfettered access to the asset.

In some aspects, policy scans may use administrative credentials to remotely authenticate with several network services running on an asset of a network system. Policy benchmarks may require that remote access of any kind is not allowed, remote access with administrative credentials is not allowed, or network services required for policy scanning must not be running. To avoid this issue, a network system owner may implement exceptions to their policy assessment results that override a non-compliant status of a policy test that conflicts with policy scanning requirements. As a result, a network system owner may be left temporarily non-compliant, if the network system owner overrides the non-compliant status prior to scanning or the network system owner may be left permanently non-compliant if the network system owner keeps their assets configured with an exception. In many cases, having an asset in a non-compliant state increases the risk of compromising an asset or the network system.

FIG. 1 illustrates an example network computing system 100 according to some aspects. The network computing system 100 may be for performing scans of one or more assets. As shown in FIG. 1, the network computing system 100 may include an electronic device 105 in electronic communication with one or more client networks 110 via the network 115. The electronic device 105 may include a scan engine 120 for performing one or more scan operations of an asset of a client network. In some aspects, the one or more client networks 110 may include at least a first client network 130a and a second client network 130b. The first client network 130a may include a first client gateway 135a controlling electronic communication traffic into and out of the first client network 130a. The first client network 130a may also include one or more first customer assets 140a. For example, the one or more first customer assets 140a may include a first customer asset #1 145a, a first customer asset #2 150a, and a first customer asset #3 155a. Similarly, the second client network 130b may include a second client gateway 135b controlling electronic communication traffic into and out of the second client network 130b. The second client network 130b may also include one or more second customer assets 140b. For example, the one or more second customer assets 140b may include a second customer asset #1 145b, a second customer asset #2 150b, and a second customer asset #3 155b.

For at least the first client network 130a of the one or more client networks 110, at least the first customer asset #1 145a may include a scan assistant 125. The scan assistant 125 may shift the challenge from credentials to software and advance the perception that software management is easier for customers from both a technical and psychological perspective. The scan assistant 125 may function on each asset and answer questions of an authenticated scan without the need to create, manage, or distribute credentials. The scan assistant 125 may provide encrypted communication with modern authentication which is an improvement on some assets. In some cases, the scan assistant may provide an asynchronous API that enables simultaneous inflight questions.

In some embodiments, the scan assistant 125 may execute as a service on the asset. The scan assistant 125 communicates with the scan engine 120 using a communication protocol that is designed and optimized to allow the scan engine to instruct the scan assistant to perform a scan of the asset. In some embodiments, the communication protocol enables the scan assistant to receive scan operations from the scan engine and return results of the scan operations to the scan engine to report a state of the asset. For example, the scan engine 125 may use the communication protocol to request certain data stored on the asset (e.g. event logs, file data, or registry data) or query for information about the asset (e.g. current CPU or memory usage metrics). In some embodiments, the scan engine 125 may instruct the scan assistant to execute a number of commands on the asset, for example, to collect and compile information about the asset to be reported to the scan engine.

In some aspects, the scan assistant 125 may use the Transport Layer Security (TLS) protocol to establish a TLS connection with the scan engine 120. For example, a TLSv1.2 or TLSv1.3 connection with one- or two-way client certificate authentication may be used to encrypt communication traffic between the scan assistant and the scan engine. Depending on the situation or embodiment, either the scan assistant or the scan engine can send the initial connection request to establish the TLS connection. In some embodiments, when the connection is established, the scan assistant 125 may receive a public certificate from the scan engine 120 and use the certificate to verify the identity of the scan engine, so as to authenticate the scan engine to perform scan operations on the asset. For example, the scan assistant may hold a public certificate (which may be seen as a certificate authority) that can be used to verify the public certificate received from the scan engine is authorized to use the scan assistant. As another example, the scan assistant may hold a public certificate (which may be seen as a certificate authority) that can be used to verify that the public certificate received from the scan engine was signed with a matching private key of the public certificate (or certificate authority) held by the scan assistant. The public certificate held by the scan assistant may be a self-signed public certificate signed by a private key held by the scan engine, or a certificate authority whose private key was used to sign the public certificate held by the scan engine. The public certificate (or certificate authority) held by the scan assistant may be stored with the scan assistant (e.g. as part of the installation package of the scan assistant), and/or pulled (e.g. retrieved) from a remote location (e.g. based on a periodic rotation schedule), and/or pushed (e.g. received) from a remote location (e.g. based on a periodic rotation schedule).

In some embodiments, the scan engine 120 may receive a second certificate from the scan assistant 125 as part of the TLS connection establishment process, which may be used to authenticate the identity of the scan assistant. However, in some embodiments, the scan engine may not use the second certificate to verify the identity of the scan assistant 125. This one-way verification process is used because in some embodiments, the scan engine will not have the authentication information of the scan assistant (e.g. the scan assistant's public certificate or a certificate authority that can verify the scan assistant's public certificate) before the connection (e.g. in embodiments where the scan assistant regenerates its certificate upon asset reboots). However, the one-way verification scheme is sufficient in this context because the scan engine is not providing sensitive information to the scan assistant, and so it is not critical for the scan assistant to establish trust to the scan engine.

The scan assistant may perform authentication schemes and/or authenticate with a scan engine. The scan engine 120 may authenticate with a scan assistant 125 using a variety of different authentication methods so that the scan assistant 125 may verify the entity scanning it and determine whether the entity scanning it is authorized (e.g., an authorized scan engine), or a yet to be built authorized client that is not a scan engine. The connecting client must authorize itself via some form of authentication. The scan assistant 125 may verify a scan engine certificate. In other words, the scan assistant 125 described herein may utilize 2-way client certificate authentication with a reversed one-way methodology. The scan engine 120 may have access to the private key associated with the public certificate, while the scan assistant 125 may be deployed with the public key associated with the public certificate (also known as a client certificate). The scan assistant 125 may be deployed with the public key, or with the client certificate itself. In some aspects, a client certificate and a public key may be fundamental equals such that a client certificate is a x509 container that includes the public key. In some cases, a x509 container may not be necessary. In some aspects, the x509 client certificate can be signed by the private key associated with the same public key in the x509 client certificate, known as a self-signed public certificate. In some aspects, the x509 client certificate can be signed by a private key associated with a certificate authority. This situation may solve a critical problem when private material is used and the client should not know the secret material required to access other clients (e.g. a client, such as the scan engine, must have the private key associated with an authorized public key to authenticate with the scan assistant).

Furthermore, scan assistant 125 may utilize a pure binary protocol, a pure HTTP protocol with text based content encapsulation such as Json or XML, and a hybrid HTTP protocol with binary based content encapsulation. A pure binary protocol may be about five times more efficient (reduced CPU load) on the scan target over the HTTP protocol when the equivalent of a zero resistance load was applied to the system (a request with no functional handler). This allowed the scan assistant 125 to service 250,000 requests per second with the binary protocol versus 50,000 requests per second with the HTTP protocol. However, in real-world scenarios, the scan assistant 125 spends most of its time in the handler of a request and in real-world tests the pure binary protocol was about two times more efficient. A conclusion may be to use the HTTP protocol with a hybrid binary based content encapsulation. The HTTP protocol may be easier to understand and maintain versus a binary protocol, and the long term engineering costs of a pure binary protocol may not merit the additional efficiencies it offers. To avoid complications with different encoding schemes and internationalization, a binary based content encapsulation may be used where data on the scan assistant is serialized into bytes and the client must decode those bytes into the appropriate encoding scheme. The HTTP protocol may maintain communication channel integrity with a combination of the "Content-Length" field when responses are small, and "Chunked Transfer Encoding" when the response is large. This may keep the protocol from being desynchronized between the client and server, as may happen with some pure binary protocols, while maintaining a very small memory footprint when moving large amounts of data e.g., when the client requests to read a large file.

The network computing system 100 may also include an external device 160 in electronic communication with the electronic device 105 and with the one or more client networks 110 via the network 115. The external device 160 may coordinate with the scan engine 120 and the scan assistant to perform scan assistant signed command execution as described further herein. In some aspects, the external device 160 may be outside a customer environment such that a customer and an entity associated with the external device 160 may both need to be compromised to completely compromise the scan assistant 125.

Figure 2:
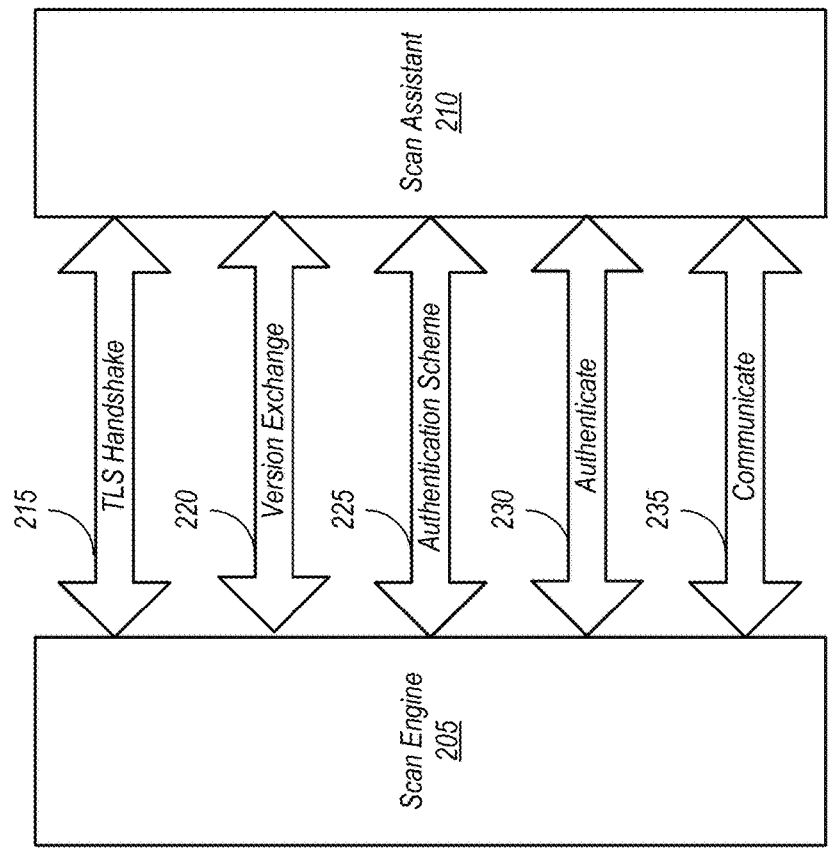
FIG. 2 illustrates an example network computing system for asset assessment according to some aspects.

FIG. 2 illustrates an example network computing system 200 for asset assessment according to some aspects. The example network computing system 200 may include one or more same or similar components as the example network computing system 100 illustrated in FIG. 1. The network computing system 200 for asset assessment may be for implementing one-way certificate authentication. When the scan engine 205 authenticates with the scan assistant 210, the scan engine 205 connects to the scan assistant 210. The scan assistant 210 could be configured to treat that connection as a client connection instead of a server connection. For example, the scan engine 205 may send down a public certificate to the scan assistant 210 so that the scan assistant 210 may verify the public certificate. This may not be a traditional application for how TLS is utilized in practice but may provide a network compatible reliable and secure method of trust establishment between the scan engine and the asset. As shown in FIG. 2, the scan engine 205 and the scan assistant 201 may perform a TLS handshake at 215, exchange versions at 220, perform authentication schemes at 225, authenticate each other at 230, and perform communications with each other at 235. In some aspects, negotiation of authentication schemes at 225, and authentication at 230, may be performed by the TLS handshake at 215 as part of the TLS protocol.

Figure 3A:
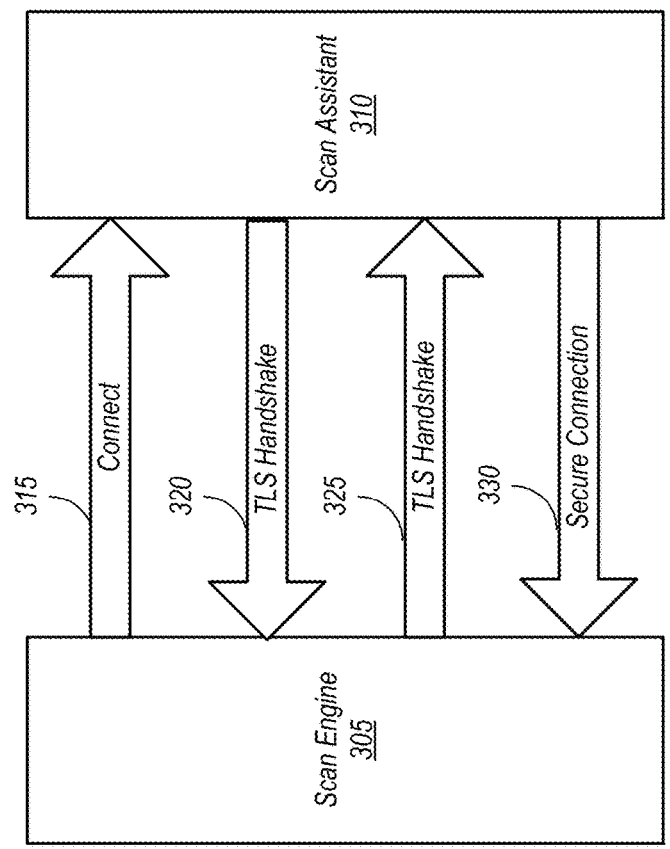
FIG. 3A illustrates an example system for asset assessment according to some aspects.
Figure 3B:
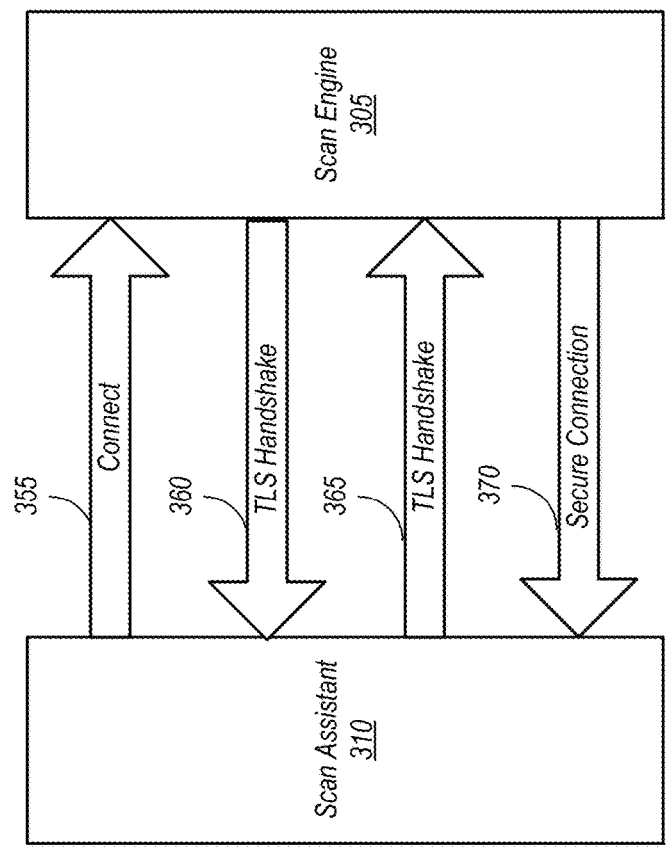
FIG. 3B illustrates an example system for asset assessment according to some aspects.

FIG. 3A illustrates an example system 300 for asset assessment according to some aspects. The network computing system 300 for asset assessment may be for implementing two-way certificate authentication. When the scan engine 305 authenticates with the scan assistant 310, the scan engine 305 may use two-way certificate authentication instead of one-way certificate authentication. This enables the scan assistant 310 to trust the scan engine 305 but also allows the scan engine 305 to trust the scan assistant 310. The most important authentication requirement is the establishment of trust and in particular the asset must trust the scan engine 305. There is benefit to having the scan engine 305 trust the asset, but the cost for such a solution may not be worth its implementation. As shown in FIG. 3A, the scan engine 305 may establish a connection with the scan assistant 310 at 315. The scan assistant 310 may perform a TLS handshake with the scan engine 305 at 320. The scan engine 305 may subsequently perform a TLS handshake with the scan assistant 310 at 325. The scan engine 305 may establish a secure connection with the scan assistant 310 at 330. FIG. 3B illustrates an example system 350 for asset assessment according to some aspects. The example system 350 may be an alternative system to the example system 300 illustrated in FIG. 3A. As shown in FIG. 3B, the scan assistant 310 may establish a connection with the scan engine 305 at 355. The scan engine 305 may perform a TLS handshake with the scan assistant 310 at 360. The scan assistant 310 may subsequently perform a TLS handshake with the scan engine 315 at 365. The scan assistant 310 may establish a secure connection with the scan engine 305 at 370.

In some aspects, authenticated scan credentials may need administrative access to be most effective which may complicate acceptance from customers to deploy such credentials. A scan assistant, instead of using credentials for an authenticated scan, may be used to communicate over the transport layer security (TLS) protocol. This may allow customers to manager an agent and it's configuration (TLS/TLS-PSK trust material such as certificates or a shared secret). This may also bypass challenges customers may experience when using credentials such as with third party credential management software (CYBERARK®). This may also bypass concerns customers may have when creating an administrative/root level credential for remote access. The scan assistant may run as a service on the system and may provide an API for the scan engine to assess the asset as if the scan engine had administrative/root credentials without such credentials. The WINDOWS® CIFS protocol may not be encrypted and when an asset is scanned all collected data sensitive or otherwise may be transmitted over the wire as unencrypted (e.g., plain text) data. The WINDOWS® CIFS protocol may be the most common protocol used to scan and assess WINDOWS® assets in our industry. The latest version of SMB (also known as CIFS) may support encryption but may not be commonly deployed or used by some scan engines. In some aspects, encryption may be included with, for example, SMB v3. For SMB v3, encryption may be required to be enabled, and may need to be configured. Conversely, with a scan assistant encryption is enabled by default and may not need to be configured. In some aspects, CIFS may be normalized to SMB. SMB may support multiple dialects and newer WINDOWS® operations systems may use new dialects such as SMB v1, SMB v2, and SMB v3.

In some aspects, some systems may use existing protocols offered to solve the problem of authenticated asset assessment. This includes OpenSSH® in UNIX and CIFS/WMI/WinRM in WINDOWS®. As described herein, instead of offering up an agent based solution, not to be confused with an INSIGHT® platform or INSIGHT® agent, that provides a secure high performance method for scan engines to perform an authenticated assessment of an asset.

The scan assistant, described herein, may provide customers with a secure alternative for authenticated scans that uses asymmetric encryption (e.g. the Elliptic Curve Digital Signature Algorithm known as ECDSA, or Rivest-Shamir-Adleman known as RSA) and symmetric encryption (e.g. the Advanced Encryption Standard known as AES) to establish a trusted secure channel between the scan engine and scan assistant. The customer may deploy the scan assistant with a public certificate in their environment and the scan engine may be given a private certificate. The scan assistant may be light weight and may be idle unless it is being scanned. The scan assistant may communicate with the scan engine using the TLS protocol with two-way client certificate authentication. The scan engine may not verify the certificate of the scan assistant (e.g., on a server side). The scan assistant may verify the scan engine certificate (the scan engine is the client in this scenario). For example, as described herein, a scan assistant may perform authentication schemes and/or authenticate with a scan engine. The scan engine may authenticate with a scan assistant using a variety of different authentication methods so that the scan assistant may verify the entity scanning it and determine whether the entity scanning it is authorized (e.g., an authorized scan engine), or a yet to be built authorized client that is not a scan engine. The connecting client must authorize itself via some form of authentication. The scan assistant may verify a scan engine certificate. This effectively may mean that the system uses two-way client certificate authentication with a reversed one-way methodology. The scan engine may have access to the private key associated with the client certificate, while the scan assistant may be deployed with the public key associated with the client certificate. For example, the scan assistant may be deployed with the public key, or with the client certificate itself. In some aspects, a client certificate and a public key may be fundamental equals such that a client certificate is a x509 container that includes the public key. In some cases, a x509 container may not be necessary. The system may solve a critical problem when private material is used (e.g., a client should not know the secret material required to access other clients). This may simplify deployment since customers only have to distribute one certificate, instead of two. Furthermore, the scan assistant service may generate a new server side certificate each time the scan assistant starts reducing the risk of a server side certificate compromise.

Figure 4:
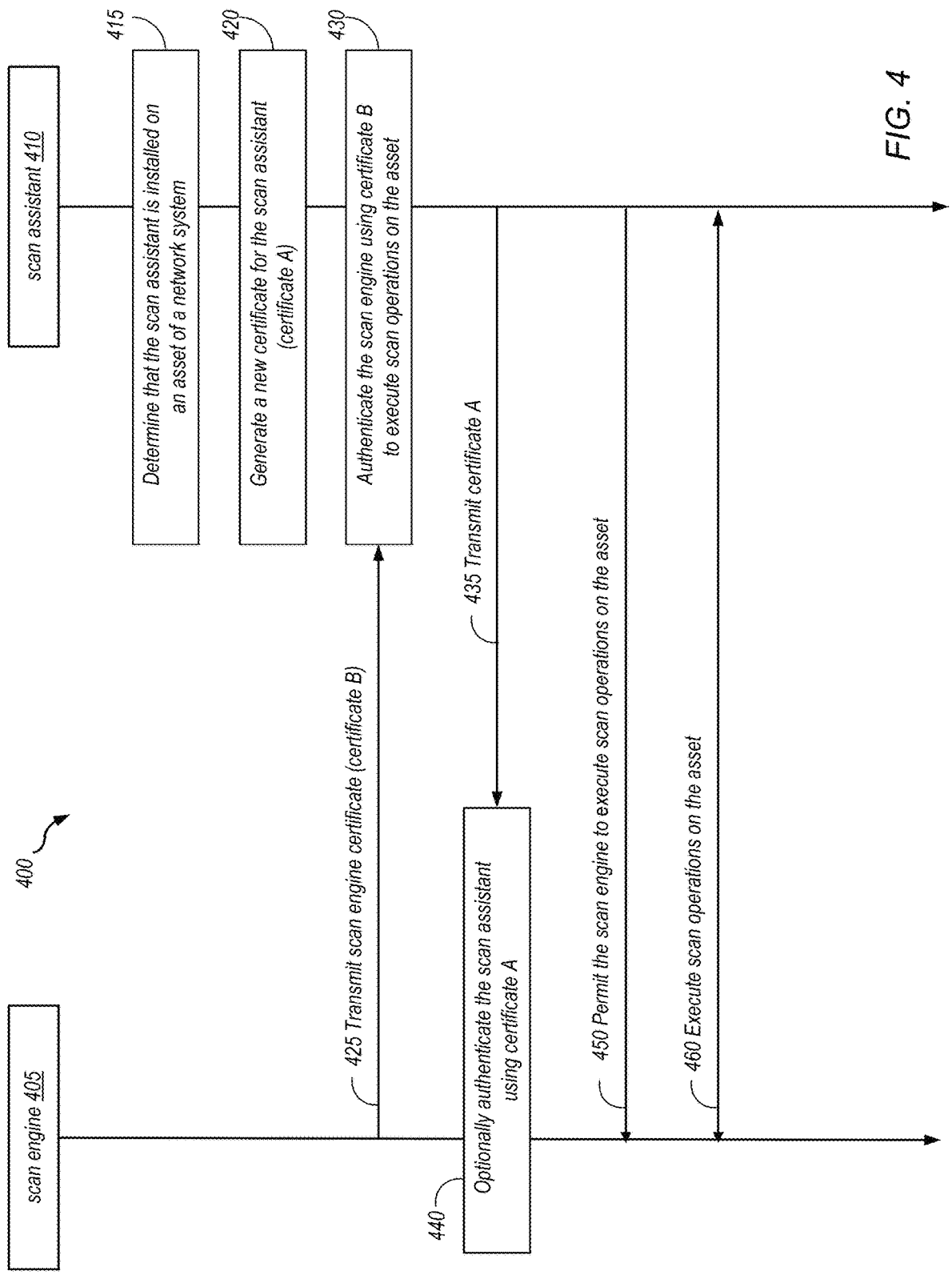
FIG. 4 illustrates an example system for performing asset assessment on an asset according to some aspects.

FIG. 4 illustrates an example system 400 for performing asset assessment on an asset according to some aspects. The example system 400 may include a scan engine 405 and a scan assistant 410. The scan engine 405 may be the same as or at least similar to the scan engine 120 illustrated in FIG. 1, the scan engine 205 illustrated in FIG. 2, and the scan engine 305 illustrated in FIGS. 3A and 3B. For example, the scan engine 405 may be located on an electronic device as described herein. The scan assistant 410 may be the same as or at least similar to the scan assistant 125 illustrated in FIG. 1, the scan assistant 310 illustrated in FIGS. 3A and 3B. For example, the scan assistant 410 may be for installation on an asset such as a customer asset as described herein.

At operation 415, the scan assistant 410 may determine that the scan assistant 410 is installed on an asset of a network system. For example, the scan assistant 410 may determine that the scan assistant 410 is installed on an asset of a network system in response to installing the scan assistant 410 on the asset of the network system. As another example, the scan assistant 410 may determine that the scan assistant 410 is installed on an asset of a network system when the asset of the network system is powered on or activated for operation.

At operation 420, the scan assistant 410 may generate a new private key and public certificate (certificate A) pair for establishing a TLS connection with the scan engine 405 to execute one or more scan operations on the asset for determining a state of the asset. The asset may include at least one computing resource. For example, the scan assistant 410 may generate the new private key and public certificate pair after (e.g., in response to) receiving the indication that the scan assistant 410 is installed or upgraded on the asset of the network system. As another example, the scan assistant 410 may generate the new private key and public certificate pair after (e.g., in response to) a reboot of the asset, restarting the scan assistant service on the asset, or receiving a public certificate from the scan engine 405 as described further herein. In some embodiments, a private key and public certificate (certificate A) may be installed with the scan assistant 410 (and/or as a component of the scan assistant) when the scan assistant 410 is installed on the asset and the private key and public certificate pair may be stored in a secure storage area in a memory of the asset for use by the scan assistant 410 as described herein. In some embodiments, the public certificate installed with the scan assistant 410 (and/or as a component of the scan assistant)

might be signed by a certificate authority. In some embodiments, the scan engine will hold (or be given) a public certificate of the certificate authority that signed the public certificate installed with the scan assistant 410 (and/or as a component of the scan assistant) and the scan engine may use the public certificate of the certificate authority to authorize (e.g. verify the signature of) the public certificate installed with the scan assistant 410. In some embodiments, the public certificate installed with the scan assistant 410 (and/or as a component of the scan assistant) might be self-signed and the scan engine will hold (or be given) the same public certificate installed with the scan assistant 410 to authorize (e.g. verify the signature of) the public certificate installed with the scan assistant 410.

In some aspects, the scan assistant 410 may generate a private key and public certificate pair, and while that public certificate may be exchanged with the scan engine 405 as part of authentication, the public certificate may not be used for authenticating. In order for a private key to be used for authentication, trust may need to be established for the public certificate associated with the private key. In some instances, trust may be established because the scan engine 405 may have a public certificate associated with the private key the scan assistant 410 has for authenticating with the scan engine 405. In some instances, trust may be established because the scan engine 405 may have a public certificate associated with the certificate authority that was used to sign the public certificate held by the scan assistant 410 for authenticating with the scan engine 405. Accordingly, the scan engine 405 may be installed with, configured one or more times, provided when starting a scan of one or more IP addresses and/or hostnames, or requested by the scan engine 405 from a local and/or remote certificate storage vault when starting the scan of an IP address and/or hostname, a public certificate to be used for authenticating the scan assistant 410 with the scan engine 405. Accordingly, the scan assistant 410 may generate a private key and public certificate pair for use with authentication (but not for authenticating), a private key and public certificate pair may be installed or configured one or more times after installation, or a private key and public certificate pair may be requested one or more times from a local and/or remote certificate storage vault.

In some aspects, if a private key is installed/configured on the scan assistant 410, proper 2-way TLS could be done if the corresponding public certificate is also provided to the scan engine 405 (e.g. the scan engine 405 may have both its own private key, plus the scan assistant's 410 public certificate, and the scan assistant 410 may have it s own private key, plus the scan engine's public certificate enabling mutual trust (2-way TLS)). In some instances, if a private key is installed/configured on the scan assistant 410 and its corresponding public certificate is signed by a certificate authority, proper 2-way TLS could be done if the public certificate associated with the certificate authority that signed the public certificate held by the scan assistant 410 is provided to the scan engine 405 (e.g. the scan engine 405 may have both its own private key, plus the public certificate associated with the certificate authority that signed the public certificate on the scan assistant 410, and the scan assistant 410 may have its own private key, plus a public certificate signed by a certificate authority whose public certificate is known to the scan engine 405 enabling mutual trust (2-way TLS)). In some instances, both the scan engine 405 and the scan assistant 410 could each have the same or a unique signed public certificate installed/configured/provided to/requested by their respective implementation (e.g. the scan engine 405 may have its own private key, and the scan assistant 410 may have its own private key, and both the scan engine 405 and the scan assistant 410 exchange public certificates signed by the same certificate authority or different certificate authorities where the scan engine 405 has the public certificate associated with the certificate authority that signed the scan assistant 410 public certificate, and the scan assistant 410 has the public certificate associated with the certificate authority that signed the scan engine 405 public certificate enabling mutual trust (2-way TLS)).

At operation 425, the scan engine 405 transmits to the scan assistant 410 a public certificate of the scan engine 405 (certificate B). Certificate B may be transmitted along with a TLS challenge to the scan assistant. In some embodiments, the public certificate B may be generated by the asset owner for authentication with the scan assistant 410 by the scan engine 405 to execute the one or more scan operations on the asset and/or for determining a state of the asset. In some embodiments, the public certificate B may be generated on behalf of an asset owner for authentication with the scan assistant 410 by the scan engine 405 to execute the one or more scan operations on the asset and/or for determining a state of the asset. Public certificate B may be signed with a private key held by the scan engine 405 (e.g. installed/configured with the scan engine 405 or provided to/requested by the scan engine 405), and the public certificate B may be held by the scan assistant 410 (e.g. installed/configured with the scan assistant 410 or provided to/requested by the scan assistant 410). Alternatively, public certificate B may be signed by a certificate authority, the private key and signed public certificate B pair may be held by the scan engine 405 (e.g. installed/configured with the scan engine 405 or provided to/requested by the scan engine 405), and the public certificate of the signing certificate authority may be held by the scan assistant 410 (e.g. installed/configured with the scan assistant 410 or provided to/requested by the scan assistant 410). Additionally or alternatively, the private key and public certificate B pair may be stored with the scan engine 405 during installation of the scan engine 405 on the electronic device for subsequent use by the scan engine 405, for example, with the scan assistant 410. The asset may include at least one computing resource. The scan engine 405 may transmit the certificate B to the scan assistant 410 so that the scan assistant 410 can authenticate the scan engine 405 to perform one or more scan operations on the asset. In some embodiments, the scan engine may hold multiple certificates (e.g. multiple certificate B's) associated with different assets, which it can use to establish TLS connections with the scan assistants on those assets.

In some embodiments, the scan engine 405 may generate the public certificate B. Additionally, or alternatively, the public certificate may be derived from the private key. Additionally, or alternatively, the derived public certificate and the private key may be stored together in a PKCS12 format which may be stored or exist encrypted or unencrypted on the file system or could exist encrypted or unencrypted in memory (e.g., provided as a credential by the NEXPOSE®/INSIGHTVM® console that manages scans, credentials, or the like). In some aspects, multiple PKCS12 files may be supported within a single scan so that customers may use multiple private key/public certificate pairs.

At operation 430, the scan assistant 410 authenticates the scan engine using certificate B received from the scan engine 405. For example, the scan assistant may verify that the public certificate B was signed using a private key held by the scan engine. The counterpart public key (or certificate authority) used to verify the certificate may be stored with the scan assistant 410 (e.g. installed/configured with the scan assistant on the asset). In some embodiments, the scan assistant 410 may request from a local certificate store the public certificate needed to perform the verification. In some embodiments, the scan assistant 410 may communicate with a remote certificate authority that issued the public certificate to perform the verification. If the public certificate B is verified, the scan assistant 410 may authenticate the scan engine 405 to execute one or more scan operations on the asset. If the public certificate cannot be verified, the scan assistant 410 may prohibit or prevent the scan engine 405 from executing one or more scan operations on the asset. For example, the scan assistant 410 may deny the request to establish the TLS connection.

At operation 435, the scan assistant 410 transmits its own certificate A to the scan engine. Certificate A may be transmitted as a reply to the scan engine's TLS connection request. At operation 440, the scan engine 405 may verify certificate A to authenticate the scan assistant to complete a two-way certificate authentication process. For example, certificate A may be signed using a second private key held by the scan assistant, and the scan engine may hold the counterpart public certificate. As another example, certificate A may be signed using a certificate authority and the counterpart public certificate held by the scan engine is the public certificate associated with the certificate authority that signed certificate A. In some embodiments, the counterpart public key may be provided to the scan engine through a separate secure process ahead of time, for example, when a scan of the asset or the network is initiated or when the scan assistant was first installed on the asset. In some embodiments, the scan engine may store, encrypted or unencrypted, on the file system or in memory, one or more public certificates and/or public certificates associated with one or more certificate authorities that can be used to verify the certificates from multiple scan assistants.

In some embodiments, the scan engine 405 may not have the scan assistant's public key a priori, and so the scan engine will not authenticate the scan assistant using certificate A. In this case, the scan engine will not establish trust to the scan assistant 410, whose communications may be intercepted and/or modified by a man-in-the-middle attack. However, because the scan assistant 410 has the client certificate from the scan engine 405, any attempt by a man-in-the-middle to modify the public certificate from the scan engine 405 may be detected by the scan assistant 410. Thus, the one-way certificate authentication process allows the scan assistant 410 to trust the scan engine 405, even though the scan engine 405 may not trust the scan assistant 410.

At operation 450, the scan assistant 410 may permit the scan engine 405 to execute the one or more scan operations on the asset. Based on verification of the public certificate B, the scan assistant 410 may authenticate the scan engine 405 to execute one or more scan operations on the asset. After the scan assistant 410 authenticates the scan engine 405 to execute the one or more scan operations on the asset, the scan engine 405 may receive permission from the scan assistant 410 to execute the one or more scan operations on the asset. In some aspects, the scan engine 405 may receive an electronic message from the scan assistant 410 indicating that the scan engine 405 has permission to execute one or more scan operations on the asset. In some aspects, the scan assistant 410 may provide access for the scan engine 405 to execute the one or more scan operations on the asset.

In some aspects, private keys may not have public certificates. A public certificate may refer to an x509 container where x509 stores the public key and provides additional properties associated with the public key. The x509 public certificate may be signed by a private key and the public certificate associated with the signing private key can verify the x509 public certificate signature. In some cases, the private key that signed the x509 public certificate is the private key paired with the x509 public certificate, known as a self-signed public certificate, and the signed x509 public certificate can verify itself. In some cases, such as with a PKI (Public Key Infrastructure), a private key, known as an issuer or signing key, that is not paired with the x509 public certificate may sign the x509 public certificate, known as a signed public certificate, and the public certificate associated with the issuer or signing key can verify the signed x509 public certificate signature.

At operation 460, the scan engine 405, in cooperation with the scan assistant 410, may execute the one or more scan operations on the asset. For example, after the scan engine 405 receives permission from the scan assistant 410 to execute the one or more scan operations on the asset, the scan engine 405 may execute at least one of one or more commands or one or more scripts on the asset.

In some aspects, after the scan assistant 410 authenticates the scan engine 405 with the scan assistant 410 to execute the one or more scan operations on the asset and after the scan engine 405, in cooperation with the scan assistant 410, executes the one or more scan operations on the asset, the scan assistant 410 may determine that the scan engine 405 may remain authenticated to execute additional scan operations on the asset (e.g. as long as the TLS connection is open). Alternatively, in some aspects, after the scan engine 405, in cooperation with the scan assistant 410, executes the one or more scan operations of the asset, the scan assistant 410 may determine that the scan engine 405 is no longer authenticated with the scan assistant 410 to execute additional scan operations on the asset without performing another authentication procedure, and require the scan engine to reauthenticate (e.g. by establishing a new TLS connection).

In some aspects, TLS may be used to support a hybrid 2-way trust scheme. A hybrid 2-way may rely on the client (e.g., the scan engine) to not verify trust of the server but the server (the scan assistant in this case) to verify trust of the client. After trust is established, other authentication schemes may be used for additional security that may be implemented as a further step within a secured TLS session.

In some embodiments, the scan engine 405 may periodically change its public certificate (certificate B) and associated private key. In at least this case, the scan assistant 410 may be updated so that the scan assistant 410 has the required information to establish trust with the scan engine 405 (e.g. the scan engine 405 can authenticate with the scan assistant 410). In some aspects, this may be done manually and/or rely on another deployment tool such as (e.g., a GPO), or the use of SCCM. The private keys may not be generated on the scan engine 410. However, the private keys may be generated on the NEXPOSE®/INSIGHTVM® console, and clients may be permitted to generate their own private keys using third party certificate management tools. The scan engine 405 may support sending the scan assistant 410 a new public certificate when the previous public certificate is no longer the latest/newest public certificate available to the scan engine 405 and the scan assistant 410 may be using an older public certificate (e.g., certificates may have expiration dates). The scan assistant 410 may support receiving a new public certificate from the scan engine 405. If the scan assistant 410 receives from the scan engine 405 a new public certificate and the scan assistant 410 supports receiving from the scan engine 405 a new public certificate the scan assistant 410 may replace (e.g. overwrite) the current public certificate (certificate B) stored in memory and/or on a file system encrypted and/or unencrypted on the asset with the new public certificate from the scan engine 405. In some embodiments, certificate A of the scan assistant may also be periodically changed. If so, the scan assistant may provide the new certificate to the scan engine, for example, as part of a certificate update process with the scan engine.

In some aspects, remote execution of commands on an asset to perform an assessment of that asset may include authenticated access to that asset. This may be achieved with services such as WinRM® on WINDOWS®, and OpenSSH® on UNIX® or similar systems. If the credential used for authenticated access becomes compromised, the credential may provide or may be used to obtain unfettered access to the asset. In some aspects, a system may be implemented in which two credentials are used to remotely execute commands on an asset. Such a system may be implemented by a scan assistant and in cooperation with a scan engine. The scan assistant may authenticate the scan engine using a customer managed certificate. The scan assistant may request the scan engine run commands signed by an administrator whose signature is included as part of the vulnerability and/or policy content release.

A system in which two cryptographic signatures may need to remotely execute commands on an asset. A first cryptographic signature may be controlled and deployed by the customer and may enable a scan engine to authenticate with the asset being scanned. The signature may allow the scan assistant to provide the commands as provided by the service owner without modifications (e.g., alterations, additions, subtractions, and the like). For example, the signature may validate the commands as the commands should be. A second credential may be controlled and deployed by a service owner (e.g., via an external device) and may sign one or more commands service owner technologies may remotely execute on an asset. In some aspects, the deployment may occur as part of a scan or may occur as part of a secondary, independent process between the scan assistant and the exterior device (e.g., owned by the service owner). Both credentials may be needed for the system to function and if one credential is compromised access to the asset is restricted/limited. For example, the customer managed credential, the private key used to establish a connection between the client and service, if compromised, may have restricted/limited access within the limitations of the available signed commands. If the service owner's private key is compromised the customer may create new commands but may not have access to authenticate with the scan assistant service. In other words, both private keys may not provide restricted/limited access and only the customer key, if compromised, would provide restricted/limited access. If the service owner's private key is compromised, then no access may be provided. But if access was obtained via, compromising both private keys, then an attacker may have unfettered access to the asset.

As an example, a customer may generate a public private key pair. The customer generated key pair may be used to control authenticated access to the scan engine. The private customer key may be assigned to the device(s), such as one or more scan engine(s), scanning the asset. The public customer key may be assigned to each asset being scanned that allows the asset to establish trust and authorize a connecting scan engine. The administrator generated key pair may be used to control what commands and/or scripts a device, such as a scan engine, can run on an asset. The private administrator key may sign the commands and/or scripts to be executed on a device. The signature of the commands and/or scripts may be shared with the device(s) that will run the commands and/or scripts on the asset. In some cases, the signatures may be shared with the asset a priori the commands and/or scripts being ran on the asset or when the commands and/or scripts run on the asset. The signature may be on a per command/script basis, or a list or map of one or more commands and/or scripts could be signed as a single entity. The administrator implementation may use a JSON® file whose contents includes multiple commands/scripts with a unique identifier per command and/or script. The administrator implementation may sign the JSON® file using the private administrator key and the signature of the JSON® file is verified by the scan assistant (e.g., INSIGHT AGENT®), scan engine, or other application/product/utility/tool that supports the JSON® file. The administrator implementation may need the signature of the JSON® file to be valid and only commands declared in the JSON® file may be permitted to run and commands in the JSON® file are referenced by their unique identifier.

Figure 5:
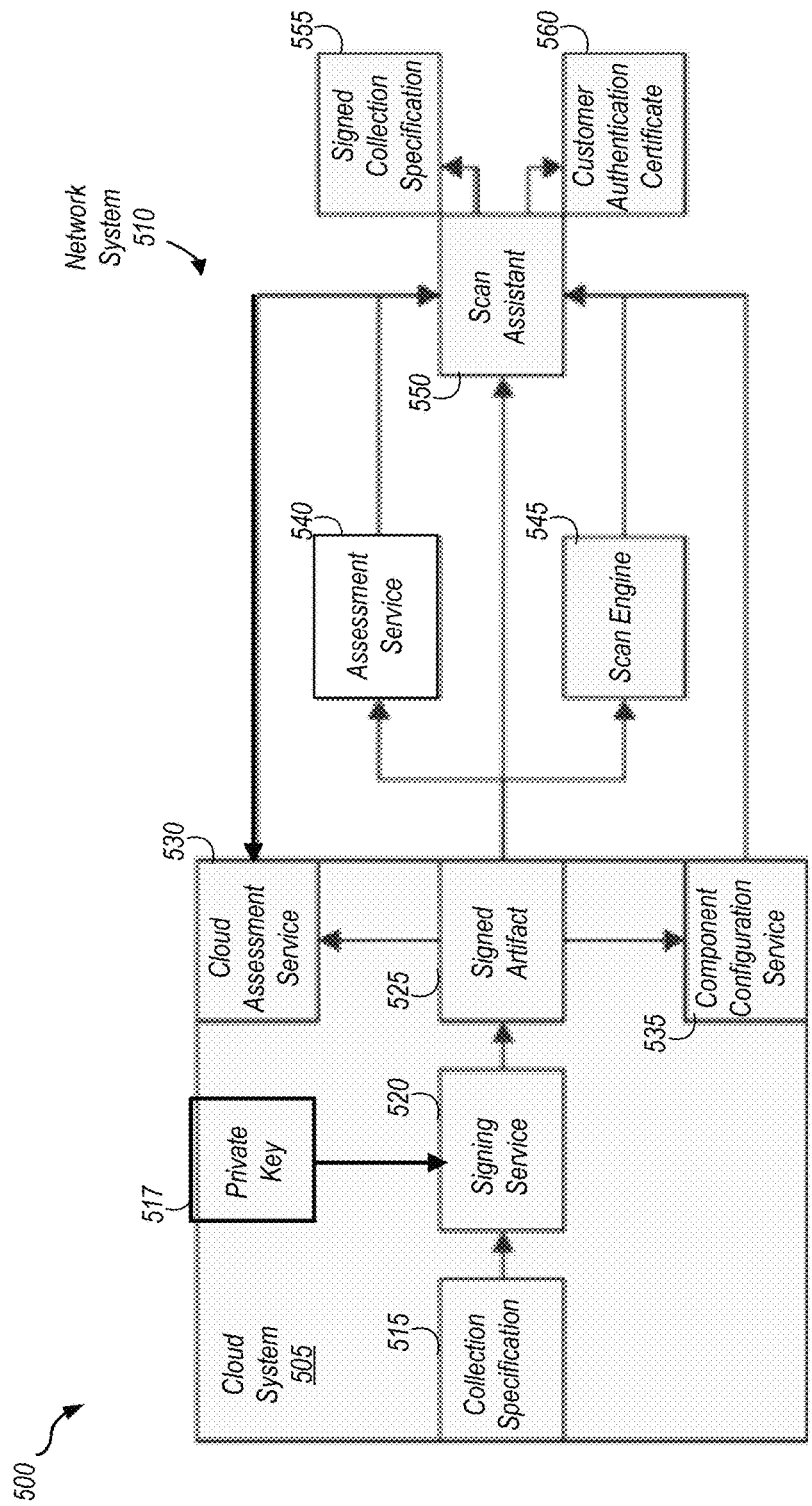
FIG. 5 illustrates example deployment options for signed command asset assessment on an asset according to some aspects.

FIG. 5 illustrates an example system 500 for signed command asset assessment on an asset according to some aspects. The system 500 illustrated in FIG. 5 may include one or more same or similar features as network computing system 100 illustrated in FIG. 1, the network computing system 200 illustrated in FIG. 2, the system 300 illustrated in FIGS. 3A and 3B, and the system 400 illustrated in FIG. 4.

As shown in FIG. 5, the system 500 may include a cloud system 505 and a network system 510. The cloud system 505 may include a collection specification device 515, a private key device 517, a signing service device 520, a signed artifact device 525, a cloud assessment service device 530, and a component configuration service device 535. The network 510 may include an assessment service device 540, a scan engine 545, a scan assistant 550, a signed collection specification storage device 555, and a customer authentication certificate storage device 560. The cloud system 505 may be an external device such as external device 160 illustrated in FIG. 1. The signed collection specification storage device 555 and the customer authentication certificate storage device 560 may be memory storage space of an asset (e.g., the first customer asset #1 145a illustrated in FIG. 1) associated with the scan assistant 550.

The figure depicts three different deployment options or usage scenarios for scan assistant 550. First, the scan assistant 550 may perform scans for the cloud assessment service 530. In that scenario, the scan assistant 550 may initiate communication with the cloud assessment service 530. Second, a local assessment service 540 may be established at the client network premises, so that the scan assistant 550 communicates with the local assessment service 540. Third, a scan engine 545 may be deployed and configured to use the scan assistant 550.

The collection specification device 515 may contain a plurality of scan operations for execution by the scan engine 545 on an asset associated with the scan assistant 550. The signing service device 520 may receive a private key or private certificate from the private key device 517 and sign one or more scan operations of the plurality of scan operations that the scan engine 545 is authorized to execute on the asset associated with the scan assistant 550. The signed artifact device 525 may receive the private key from the signing service device 520 and generate a public-private administrator certificate pair including the signed one or more scan operations. The signed artifact device 525 may provide the public administrator certificate of the public-private administrator certificate pair to the cloud assessment service device 530 for subsequent transmission to the assessment service device 540. The assessment service device 540 may transmit the public administrator certificate to the scan engine 545 for subsequent transmission to the scan assistant 550 for scan operation verification. The signed artifact device 525 may also provide the public administrator certificate of the public-private administrator certificate pair to the component configuration service device 535 for subsequent transmission to the scan assistant 550. The scan assistant may store the public administrator certificate in the customer authentication certificate storage device 560 and the signed one or more scan operations in the signed collection specification storage device 555.

It should be understood that the assessment service device 540 may be an on-premises (e.g., at or near the location of the asset). In some aspects, a signed command file may be bound and/or scoped to an authenticated session. For example, the assessment service device 540 may authenticate a session to the scan assistant 550. Additionally, or alternatively, a scan engine 545 may authenticate a session to the scan assistant 550. After authentication, the authenticating client (e.g., the assessment service device 540 and/or the scan engine 545) may transmit command data and a signature to the scan assistant 550. In some aspects, the authenticating client (e.g., the assessment service device 540 and/or the scan engine 545) may transmit command data and a signature if command data exists for the platform and/or operating system the scan assistant 550 is running on, and if command data is needed for the assessment running against the scan assistant (e.g., not all assessments may need to run commands). In some aspects, the scan assistant 550 may request the latest signed command file from the signed artifact 525 (e.g., the cloud). For at least this case, the latest signed command file may include a global bound/scope signature file that applies to all authenticating clients. In some aspects, the latest command data may complement command data transmitted from the assessment service device 540 and/or the scan engine 545 to the scan assistant 550. In some aspects, the latest command data may override command data transmitted from the assessment service device 540 and/or the scan engine 545 to the scan assistant 550. In some aspects, the latest command data may be overridden by command data transmitted from the assessment service device 540 and/or the scan engine 545 to the scan assistant 550.

In some aspects, a client associated with an asset may formulate a public-private client certificate pair (e.g., key pair) providing the public client certificate to the scan assistant 550 when stored on an asset and providing the private client certificate to the scan engine 545 when stored and/or executed on an electronic device. The public-private client certificate pair may be used to establish a trusted electronic communications connection with the scan engine 545 and control an authentication process of the scan engine 545 with the scan assistant 550 for executing one or more scan operations on an asset associated with (e.g., containing, storing, in electronic communication with, and the like) the scan assistant 550. In some aspects, the public client certificate may be the same as or at least similar to the public certificate described herein. Additionally, or alternatively, the private client certificate may be the same as or at least similar to the private certificate described herein. Additionally, or alternatively, the public-private client certificate pair may be the same as or at least similar to the public-private certificate pair described herein.

In some aspects, an administrator may formulate a public-private administrator certificate pair (e.g., key pair) providing the public administrator certificate to the scan assistant 550 when stored on an asset and providing the private administrator certificate to the scan engine 545 when stored and/or executed on an electronic device. The public-private administrator certificate pair may be used to control and/or for the scan assistant 550 to identify which scan operations (e.g., commands, scripts, and the like) the scan engine 545 is authorized to execute on the asset associated with the scan assistant 550. For example, the public administrator certificate may be transmitted to the scan assistant 550 for subsequent authentication by the scan assistant 550 of the private administrator certification. The private administrator certificate may be transmitted to the scan engine 545 for subsequent transmission to the scan assistant 550 and may identify one or more signed scan operations (e.g., one or more commands and/or one or more scripts) authorized for execution on the asset. The scan engine 545 may provide to the scan assistant 550 the private administrator certificate for authentication and an indication of one or more scan operations that the scan engine 545 seeks to execute on the asset associated with the scan assistant 550. Upon receiving the private administrator certificate and the indication of one or more scan operations that the scan engine 545 seeks to execute on the asset associated with the scan assistant 550, the scan assistant 550 may compare the private administrator certificate with the public administrator certificate and determine that the private administrator certificate and the public administrator certificate are the public-private administrator certificate pair. Determining that the private administrator certificate and the public administrator certificate are the public-private administrator certificate pair may unlock or reveal the one or more signed scan operations in the private administrator certificate that are authorized for execution on the asset associated with the scan assistant 550.

Based on determining that the private administrator certificate and the public administrator certificate are the public-private administrator certificate pair, the scan assistant 550 may compare the one or more scan operations that the scan engine 545 seeks to execute on the asset associated with the scan assistant 550 and determines whether at least one scan operation of the one or more scan operations matches at least one signed scan operation of the one or more signed scan operations provided by the public administrator certificate. If at least one scan operation of the one or more scan operations matches at least one signed scan operation of the one or more signed scan operations provided by the private administrator certificate, then the scan assistant 550 may permit the scan engine 545 to execute the at least one scan operation that matches at least one signed scan operation provided by the public administrator certificate. If at least one scan operation of the one or more scan operations does not match at least one signed scan operation of the one or more signed scan operations provided by the private administrator certificate, then the scan assistant 550 may prevent or restrict the scan engine 545 from executing any of the scan operations that the scan engine seeks to execute on the asset.

In some aspects, the private administrator certificate including the signature(s) may be provided to the scan assistant 550 associated with the asset before (e.g., a priori) the one or more commands and/or the one or more scripts are executed on the asset. In some aspects, the private administrator certificate including the signature(s) may be provided to the scan assistant 550 associated with the asset while the one or more commands and/or the one or more scripts are being executed on the asset.

As described herein, the cloud system 505 may be representative of the external device 160 illustrated in FIG. 1. In some aspects, the cloud system 505 and the external device 160 may be associated with a RAPID7® cloud/platform such that the assessment service device 540 and the scan engine 545 are on-premise components. The private key generated by the private key device 517 may not leave the cloud system 505 and may not be available for on-premise components. In some aspects, the collection specification device 515 may provide data that represents command identifier/command pairs. The signing service device 520 may provide a service such that a collection specification provided by the collection specification device 515 and signed by the signing service device 520 generates a signed artifact at the signed artifact device 525. In some aspects, the cloud assessment service device 530 and the assessment service device 540 may include one or more same or similar components and/or functions, except that cloud assessment service device 530 may be associated with the cloud system 505 (e.g., RAPID7®) while the assessment service device 540 may be associated with a customer in their network/in their environment. In some aspects, the signed collection specification device 555 may store one or more signed collection specification documents. These documents may include one or more copies of the signed artifacts of the signed artifact device 525. The component configuration service device 535 may implement a secondary/independent process to provide and maintain the signed collection specification documents of the signed artifact device 525 and the signed collection specification device 555 on the asset running the scan assistant 550. The signed collection specialist device 555 and the customer authentication certificate device 560 provide that data exists alongside the scan assistant 550 in some way such as in a file system storage, WINDOWS® registry storage, ephemeral or static in-memory storage, or the like. In some aspects, the assessment service device 540 and scan engine 545 may have one or more same or similar components and/or perform one or more same or similar functions. In some aspects, the scan engine 545 may connect to the scan assistant 550 as part of a scan while the scan assistant 550 may connect to the assessment service device 540 to be assessed by the assessment service device 540 on some schedule or on-demand basis. In some aspects, the scan assistant 550 connected to the assessment service 540 may use a one-way TLS session instead of a two-way TLS session as described with respect to FIG. 4. The scan assistant 550 may connect to the cloud assessment service device 530.

In some aspects, the collection specification device 515 may contain a plurality of scan operations for execution by one of or both the assessment service 540 and/or scan engine 545 on an asset associated with the scan assistant 550. The signed artifact device 525 may not generate a private key. In some aspects, the private key 517 may exist in a secure data-store outside the architecture described. For example, the assessment service device 540 may authenticate a session to the scan assistant 550. The scan assistant 550 may authenticate a session to the assessment service device 540. In some aspects, an administrator may formulate a public-private administrator certificate pair (e.g., key pair) providing the public administrator certificate to the scan assistant 550 when stored on an asset. The private administrator certificate may be transmitted to the scan engine 545 for subsequent transmission to the scan assistant 550.

In some aspects, the exterior device or the cloud system 505 may have a certificate that is not transmitted to the scan assistant and is not stored in the customer authentication certificate store 560. Instead the certificate is a variable defined within the scan assistant 550 source code. In other words, a static value may be included in the scan assistant during compiling. This may reduce risk since if the cloud system certificate could be overwritten that could enable an attacker with access to the scan assistant to overwrite the cloud system certificate with their own certificate allowing the attacker unfettered access to the asset. To securely support changing the cloud system certificate, an independent channel may be used as a secondary/direct channel with a secondary means to establish trust (e.g., if the scan assistant 550 established a connection with the component configuration service 535 or if the customer used a GPO, or SCCM, to configure a new certificate). It may not be secure to provide the administrative certificate via the same channel authenticated with the customers certificate because if the customers certificate was compromised, and if a compromised customer certificate could overwrite the administrative certificate, then a compromised customer certificate with restricted/limited access may be used to overwrite the administrative certificate and obtain unfettered access to the asset.

In some aspects, signed commands may be signed as part of the NEXPOSE®-content build process (e.g., it may be automated and part of the regular release cycle associated with delivering content updates). In this case, the process may be external from the customer in that a service owner (e.g., not the client or system owner) owns the private key, the vulnerability content, and provides to the customer, again via automation, vulnerability content updates that the NEXPOSE®/INSIGHTVM® console may download and provide to itself as an update, and may provide to any distributed scan engines the customers have paired with the NEXPOSE®/INSIGHTVM® console. The scan assistant may include the public certificate associated with the private key that the service owner used to sign the command in service owner's vulnerability content. When the scan engine goes to run those commands, the scan assistant may verify those commands are signed by the service owner's private key. In some implementations, the scan engine may send the entire list of commands, signed, to the scan assistant where each command is tagged (e.g., has a unique identifier) and the scan engine may instruct the scan assistant on what unique identifiers to run, and when. The scan engine may also provide any parameters that the scan assistant is able to safely integrate into commands that might be dynamic versus static commands that would take no parameters. In some aspects, the scan assistant may obtain the signed commands from the platform (or perhaps the external device 160 of FIG. 1) by means of an independent/direct communication channel with the external device.

Figure 6:
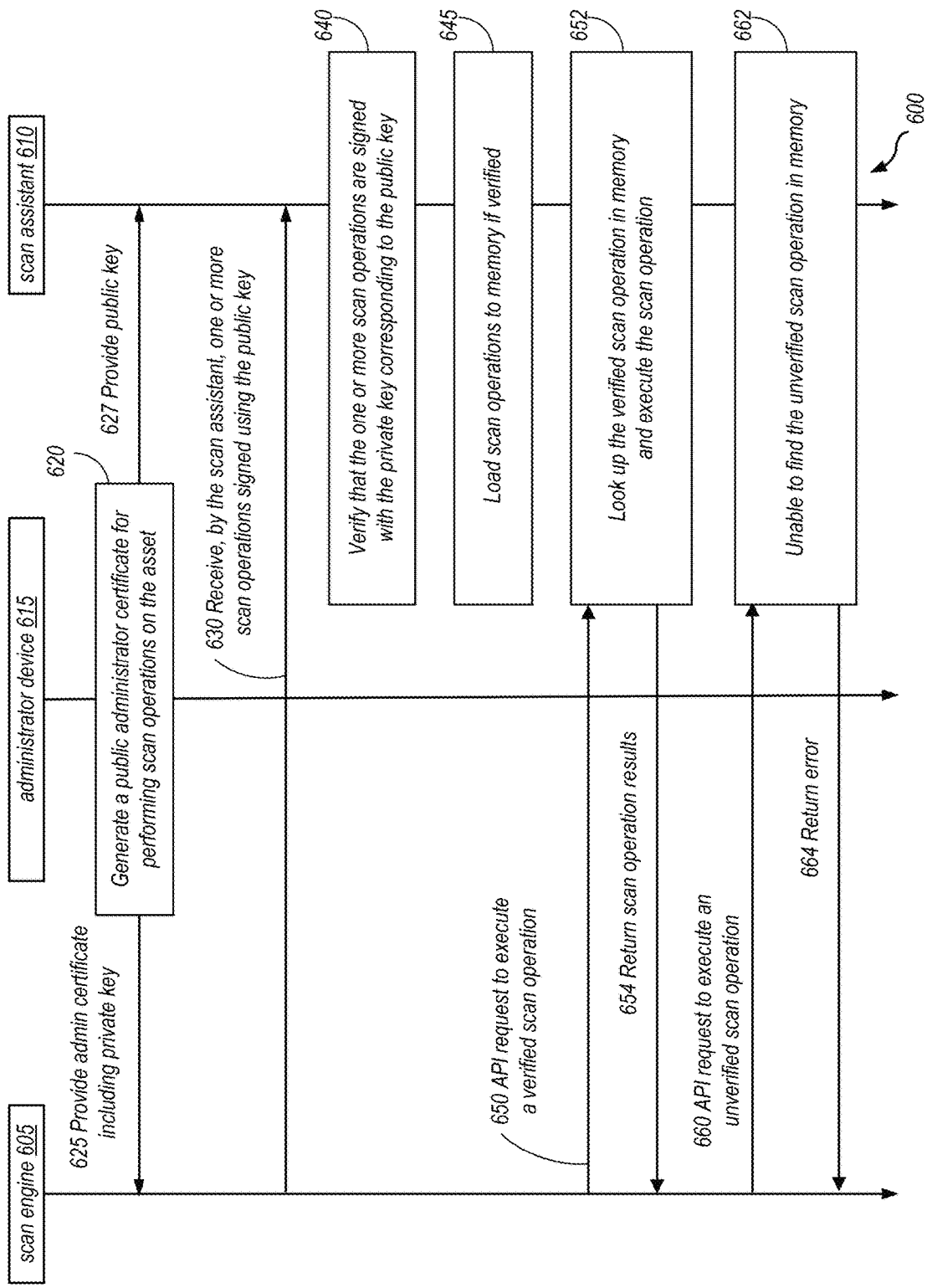
FIG. 6 illustrates an example system for performing signed command asset assessment on an asset according to some aspects.

FIG. 6 illustrates an example system 600 for performing signed command asset assessment on an asset according to some aspects. The example system 600 may include a scan engine 605, a scan assistant 610, and an administrator device 615. The scan engine 605 may be the same as or at least similar to the scan engine 120 illustrated in FIG. 1, the scan engine 205 illustrated in FIG. 2, the scan engine 305 illustrated in FIGS. 3A and 3B, the scan engine 405 illustrated in FIG. 4, and the scan engine 545 illustrated in FIG. 5. For example, the scan engine 605 may be located on an electronic device as described herein. The scan assistant 610 may be the same as or at least similar to the scan assistant 125 illustrated in FIG. 1, the scan assistant 310 illustrated in FIGS. 3A and 3B, the scan assistant 410 illustrated in FIG. 4, and the scan assistant 550 illustrated in FIG. 5. For example, the scan assistant 610 may be for installation on an asset such as a customer asset as described herein. The external device 615 may be the same as or at least similar to the external device 160 illustrated in FIG. 1, and the assessment service device 540 illustrated in FIG. 5.

At operation 620, a public administrator certificate is generated by an administrator or on an administrator device. The public administrator certificate may be issued to an owner of the asset and includes a private key and a public key pair, where the private key is used to sign scan operations requested by the scan engine 605. As shown, in some embodiments, the public administrator certificate (including the private key) is provided 625 to the scan engine 605 and the public key is provided 627 to the scan assistant 610 for use to verify the signed scan operations. In some embodiments, the public key is stored as part of the scan assistant 610, for example, pinned in an executable binary of the scan assistant. Thus, the scan assistant 610 is hardcoded with the knowledge to verify the public administrator certificate (i.e. scan operations signed using the private key associated with the certificate).

The scan engine 605 may receive a public administrator certificate from the security network device 615 for determining a state of the asset. The asset may include at least one computing resource. The public administrator certificate may be a component of the public-private administrator certificate pair used to control and/or for the scan assistant 610 to identify which scan operations (e.g., commands, scripts, and the like) the scan engine 605 is authorized to execute on the asset associated with the scan assistant 610.

In some aspects, signed scan operations may be signed by the private key, which may not be not shared with the customer. Signed scan operations may be verified using a public key. A public key allows verification of a signature made by the private key without exposing the private key. In some aspects, only private keys can be used to sign. In this case, private keys may be sensitive material and must be protected. Conversely, public keys may not be sensitive material and may be shared. For example, the Scan Assistant may use an API call to upload signed command data. The signed command data may include a series of unique key value pairs (e.g., stored in JSON). The command data may be signed by a private key on a secure internal service. The scan assistant may be provided with the public key either as a separate file part of the installation and/or embedded in the scan assistant source code. Thus, the public key may be statically built into the application. When the scan engine connects and authenticates, the scan engine may send the signed command data. The signed command data may be a key value pair where the key is a unique identifier associated with each command the scan engine is allowed to run. The value may be the command itself to run when the scan engine wants to run the unique identifier. In other words, the scan engine may not run commands directly, but rather may request the scan assistant run unique identifiers that map to commands. The commands may be any combination of UNIX® shell commands, powershell commands, WINDOWS® command prompt commands, UNIX® scripts, powershell scripts, or the like. The UNIX® shell commands and UNIX® scripts could run on bash, sh, csh, tcsh, or other UNIX® shells. For example, command file (json) {"command_1": "uname-a", "command_2": "cat/etc/lsb_release|grep 'DISTRIB_RELEASE'|cut-d'='-f2"} command sig (signature) file, a binary signature represented in hexadecimal code. In some aspects, the command file and the command signature may be two separate files or may be a single file that contains both the command data and the signature.

At operation 630, the scan assistant 610 may receive one or more signed operations signed using the public key. In some embodiments, before or along with receipt of the scan operations, the scan assistant may receive a scan engine certificate (e.g. certificate B in FIG. 4) from the scan engine 605, and authenticate the scan engine using the scan engine certificate, as discussed in connection with FIG. 4. Accordingly, the protocol provides two layers of security: (1) authentication of the scan engine to establish a connection, and (2) verification of signed scan operations received over the connection. In some embodiments, the public administrator certificate may be sent along with the signed scan operations.

The public administrator certificate may be used to control and/or for the scan assistant 610 to identify which scan operations (e.g., commands, scripts, and the like) the scan engine 605 is authorized to execute on the asset associated with the scan assistant 610. In some embodiments, the scan engine 605 may send an entire collection of scan operations that may be used during a scan. Depending on the embodiment, the scan operations may be signed individually or the entire collection may be signed as a group. In some embodiments, the scan operations may be commands that are natively executable on the asset. For example, the scan operations may be certain operating system commands or pre-deployed scripts containing many commands. In some embodiments, the commands are categorized based on the operating system. Furthermore, a command may be categorized as a command for UNIX or POSIX compliant systems or a command for Powershell or WINDOWS. In some embodiments, script commands may indicate the type of shell that should be used to execute the script, such as "bash," "sh," "csh," or "tcsh."

In some embodiments, the collection of scan operations of commands may be stored in a key-value map that associates each scan operation or command with a unique identifier. This identifier may later be used by the scan engine to refer to the commands in later execution requests to the scan assistant submitted through the scan assistant API. Thus, the scan assistant will initially load a key-value map of commands into memory in response to a first API call, and then look up the commands in the key-value map in response to subsequent API calls from the scan engine. In some embodiments, the commands are signed by signing the key-value map data structure.

In some embodiments, the signed commands are part of a "collection specification," or a group of commands used for a particular type of data collection. Each version of the collection specification may be associated with a different public administrator certificate and public/private key pair. In some embodiments, the scan assistant may have the public keys for multiple versions of a collection specification and be able to verify sign commands from the multiple versions.

In some aspects, the console may maintain an internal database of certificates for use with the scan assistant. This may include a private key and a public key. The private key and public key may be encrypted, at rest, in this database. In some aspects, the console may transmit the private key and public key to the scan engine 605 when a scan is requested. One or more scan assistant certificates may be associated with that scan. The scan engine 605 may sort the certificates received in order of "longest to live" first. A certificate (e.g., an x509 certificate) may include attributes such as an expiration date. The expiration date may be used to determine how long a certificate will live. The longest lived certificate may be used first, followed by the second longest, and so on. If the scan assistant 610 does not support the longest lived certificate but some other certificate that the scan engine 605 was given, the scan engine 605 may send the longest lived certificate to the scan assistant 610 to overwrite the certificate that the scan assistant 610 has at that time. In this regard the scan engine "rotates" certificates for clients by synchronizing the latest certificate with the scan assistant 610 when applicable. For example, a customer may generate a certificate that expires in six (6) months. The certificate may be deployed to all assets running a scan assistant. A private key may be deployed to the console. Subsequently, months go by before the customer generates a new certificate that expires in six months. The new certificate may be synchronized with scan assistants on their next scan. Scans may originate from the console (known as a local scan) or a scan engine (known as a remote or distributed scan). Subsequently, six months go by, and the customer generates a new certificate that expires in six months. Sample rules apply, however now the customer might delete the first certificate or the console could be asked to auto delete it, since it has expired. This overlap may be important since if a certificate expires before rotation that means it will no longer work for authentication.

At operation 640, the scan assistant may verify that the one or more signed scan operations are signed with a private key corresponding to the public key. The verification may be performed by applying a cryptographic operation to the signed scan operations using the public key, and verifying that the results are in an expected form. A successful verification proves that the signer of the scan operations is an entity that is authorized to execute the scan operations on the asset. In some embodiments, a successful verification of the scan operations may be acknowledged back to the scan engine 605, for example, in a message explicitly indicating that the scan engine is permitted to execute the scan operations on the asset. In some embodiments, an unsuccessful verification may cause an error message to be generated back to the scan engine 605. In some embodiments, an unsuccessful verification may cause no response to be generated back to the scan engine.

At operation 645, the scan assistant loads the scan operations into its runtime memory, if the scan operations are verified. However, if the scan operations are not verified, the scan assistant refrains from loading the scan operations into memory, so that the operations cannot be used during the scan. In some embodiments, if the scan operations cannot be verified, the key-value map that assigns the operation identifiers to the operations is not loaded into memory. A subsequent attempt to look up an unloaded operation by the scan assistant would result in a "operation not found" exception.

At operation 650, the scan engine 605 sends an API request to the scan assistant 610 to execute one of the scan operations that was verified. In some embodiments, the API request may indicate a list of scan operations to be performed and indicate the unique identifiers of the scan operations. In response, at operation 652, the scan assistant looks up the scan operation(s) in memory and executes the operations according to the API request. As discussed, these scan operations may collect scan operation results that indicate a current state of the asset. At operation 654, the scan operation results are sent back to the scan engine. In some embodiments, a single scan of the asset may involve multiple API requests 650, which may request more and more asset data to be collected. The scan may proceed in this "conversational" fashion between the scan engine and the scan assistant, using the verified scan operations loaded in the scan assistant's runtime memory.

At operation 660, the scan engine 605 sends another API request to execute a scan operation that was not verified (and thus not loaded into the runtime memory of the scan assistant). In response to this request, the scan assistant is not able to find 662 the requested scan operation in its runtime memory. Accordingly, the scan assistant will return an error 664 to the scan engine, indicating that the unverified scan operation was not found and not executed. In some embodiments, if the scan engine requests a sequence of several scan operations that include just one unverified operation, the entire sequence of operations will be rejected and not executed. In some embodiments, the scan assistant may execute scan operations up to the unverified operation and return only partial results for the operations that were executed.

In some aspects, policy scans may use administrative credentials to remotely authenticate with several network services running on an asset. Policy benchmarks may indicate that remote access of any kind is not allowed, remote access with administrative credentials is not allowed, and/or network services required for policy scanning must not be running. Examples may include that the "Access this computer from the network (SeNetworkLogonRight)" user right, Administrative shares, and the Windows Remote Registry service, access this computer from the network" user right is prohibited, access to administrative shares is prohibited, administrative shares are disabled, access to the WINDOWS® remote registry is restricted or prohibited, the WINDOWS® remote registry service is disabled, or the like. To address or work around this issue, customers may apply exceptions to their policy assessment results that override the non-compliant status of a policy test that conflicts with policy scanning requirements. This may leave the customer temporarily non-compliant if the customer does this as a workflow prior to scanning, or permanently non-compliant if the customer keeps their assets configured with this exception. A non-compliant state may increase the risk of compromise.

Using a scan assistant to work around policy exceptions may otherwise be needed by customers for customers to use the NEXPOSE®/INSIGHTVM® product for policy scanning. The use of a third party service that does not require remote authentication with system credentials may work around the need for policy exceptions when using system credentials to remotely authenticate with network services native to the system. In this case, the scan assistant may be a third party service used to solve this problem. Other third party tools may also be used such as OSQUERY®. A third party service, such as a scan assistant, may be used to provide the scan engine with secure access to information about an asset needed for policy assessment. The third party service may work around the problem by not requiring remote authentication with system credentials.

Figure 7:
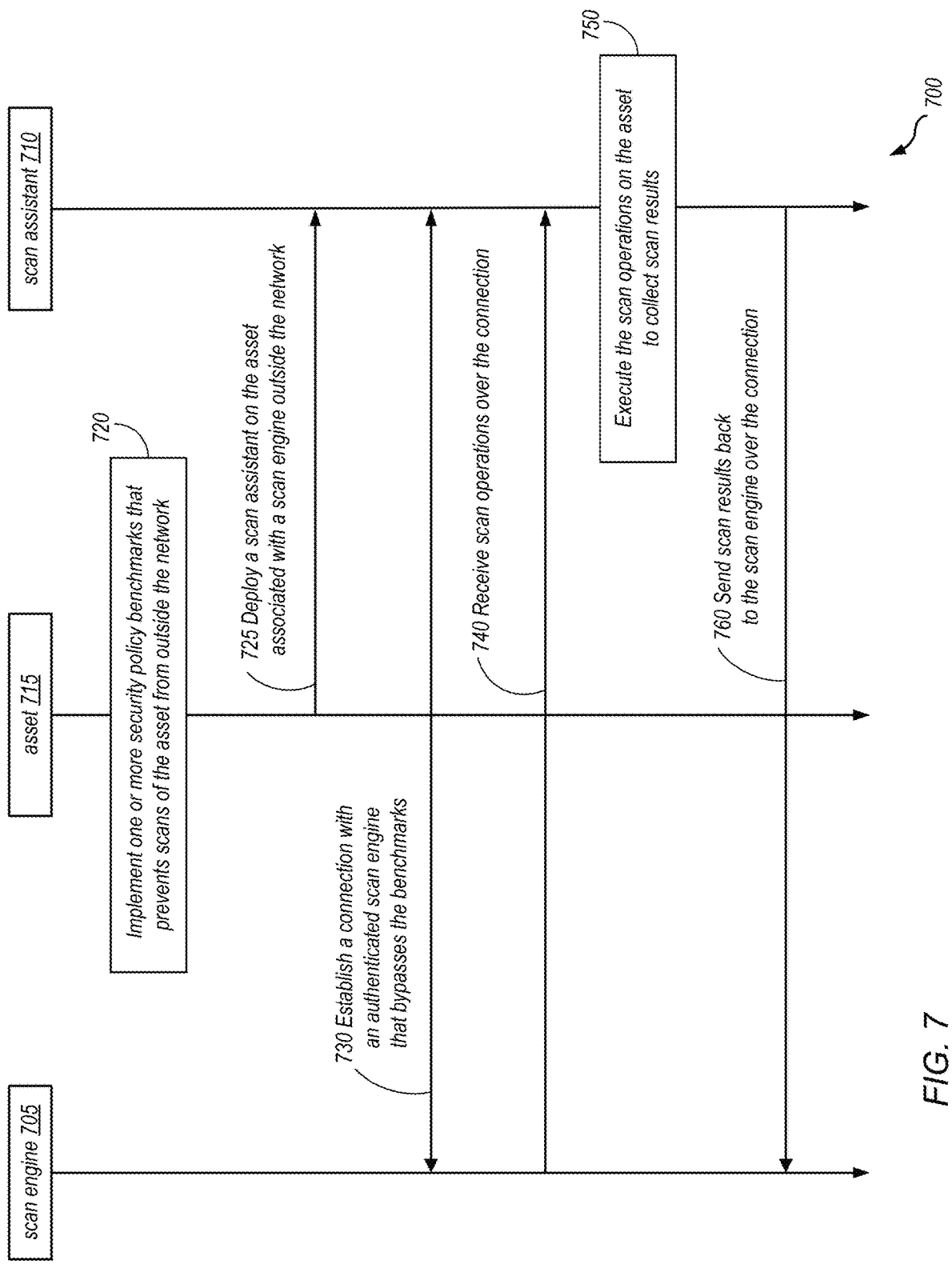
FIG. 7 illustrates an example system for performing asset assessment on an asset with policy exemptions according to some aspects.

FIG. 7 illustrates an example system for performing asset assessment on an asset with policy exemptions according to some aspects. The example system 700 may include a scan engine 705, a scan assistant 710, and an asset 715. The scan engine 705 may be the same as or at least similar to the scan engine 120 illustrated in FIG. 1, the scan engine 205 illustrated in FIG. 2, the scan engine 305 illustrated in FIGS. 3A and 3B, the scan engine 405 illustrated in FIG. 4, the scan engine 545 illustrated in FIG. 5, and the scan engine 605 illustrated in FIG. 6. For example, the scan engine 705 may be located on an electronic device as described herein. The scan assistant 710 may be the same as or at least similar to the scan assistant 125 illustrated in FIG. 1, the scan assistant 310 illustrated in FIGS. 3A and 3B, the scan assistant 410 illustrated in FIG. 4, the scan assistant 550 illustrated in FIG. 5, and the scan assistant 610 illustrated in FIG. 6. For example, the scan assistant 710 may be for installation on an asset such as a customer asset as described herein. The asset 715 may be the same as or at least similar to the client assets 145, 150, and 155 of FIG. 1.

At operation 720, the asset implements one or more security policy benchmarks that prevents the asset from being scanned from outside the network in which the asset resides. The security policy benchmarks may be implemented by security administrators of the network. For example, the policy benchmarks may prohibit all remote access or connections to certain types of services on the asset (e.g. WMI or SMB/CIFS services on WINDOWS machines). As another example, the policy benchmarks may prohibit remote access of connection to the asset using an administrative credential (e.g. as a system administrator). As another example, the policy benchmarks may permit connection to the asset, but restrict the operations that the remote user can perform on the asset (e.g. as configured via WINDOWS user account control (UAC) settings). As discussed, these policy benchmarks can interfere with or prevent a remote scanning process from the scan engine 705 (e.g. prevent execution of one or more scanning operations).

In some aspects, the scan engine 705 may be within a network of the asset associated with the scan assistant 710. In this case, the one or more policy benchmarks may prohibit access to the asset by other components including the scan engine 705 that are local on the network of the asset. In some aspects, the scan engine 705 may be outside of a network of the asset associated with the scan assistant 710. In this case, the one or more policy benchmarks may prohibit access to the asset by components including the scan engine 705 that are remote outside the network of the asset. In some aspects, the one or more policy benchmarks may prohibit access to the asset by other components including the scan engine 705 regardless of whether the other components including the scan engine 705 are local on the network of the asset or remote outside the network of the asset.

At operation 725, the scan assistant 710 is deployed on the asset, which is associated with the scan engine 705 outside the network. In some embodiments, the scan assistant may be provided by the operator of the scan engine and deployed via an administrative device. The scan assistant may be configured with a public key that can be used to authenticate requests signed by the scan engine. In some embodiments, once installed, the scan assistant may be launched or executed on the asset as a service, and periodically connect with the scan engine to perform scans of the asset. The scan assistant 710 may execute as an authenticated administrator user on the asset, so that it is able to execute all scan operations requested by the scan engine. No exceptions or changes to the policy benchmarks are needed to allow scan operations to be executed on the asset.

At operation 730, a connection is established between the scan engine and the scan assistant. In some embodiments, the scan engine is authenticated prior to the connection being established, for example, using a one-way or two-way authentication process as discussed in connection with FIG. 4. The connection may be a TLS connection and, depending on the embodiment, either the scan engine or the scan assistant may initiate the connection by sending the initial connection request.

At operation 740, the scan assistant receives, from the scan engine and over the connection, scan operations to perform as part of a scan of the asset. As discussed, the scan operation may be received via a specialized communication protocol (e.g. a purely binary protocol) implemented between the scan engine and the scan assistant. The scan operations may indicate individual commands or scripts that are executable on the asset. In some embodiments, the scan operations, either individually or as a collection, may be signed by the scan engine using a second signing key and verified by the scan assistant to provide a second layer of security during the scanning process.

At operation 750, the scan assistant executes the scan operations on the asset and collects scan results. The scan results may include various types of data about the asset such as file system contents, configuration states, operation states, system events, performance statistics or metrics, etc. At operation 760, the scan results are sent back to the scan engine over the connection. In this manner, use of the connection between the scan engine and the scan assistant bypasses the policy benchmarks implemented on the asset, allowing a variety of scan operations to be performed on the asset from a trusted scan engine without having to create exceptions in the security policies.

In some embodiments, the scan assistant 710 may transmit an indication to a gateway of the network (e.g. gateway 135 of FIG. 1) that the scan engine is permitted to bypass the one or more policy benchmarks prohibiting access to the asset in order for the scan engine 705 to execute the one or more scan operations on the asset. For example, the gateway may be implementing one or more policy benchmarks prohibiting access to one or more components of the networks including the asset. The scan assistant 710 may generate a credential for transmission to the gateway instructing the gateway to allow the scan engine 705 to bypass the one or more policy benchmarks to execute the one or more scan operations on the asset. In some aspects, the credential may instruct the gateway to allow the scan engine 705 to bypass the one or more policy benchmarks to execute the one or more scan operations on the asset without applying one or more policy exemptions for the scan engine 705. Thus, in this case, the credential may allow the scan engine 705 to bypass the one or more policy benchmarks to execute the one or more scan operations on the asset only for the duration of the one or more scan operations. Alternatively, the credential may allow the scan engine 705 to bypass the one or more policy benchmarks to execute scan operations on the asset only for the duration of the one or more scan operations and for a period of time (e.g., an indefinite period of time, a predetermined period of time) after executing the one or more scan operations on the asset.

In some aspect as described further herein, when a gateway is not used and/or at least one of the one or more policy benchmarks prohibiting access to the asset are stored in a memory of the asset, the scan assistant 710 may transmit an indication to the scan engine 705 that the scan engine 705 is permitted to bypass the one or more policy benchmarks prohibiting access to the asset in order for the scan engine 705 to execute the one or more scan operations on the asset. For example, the asset may be implementing one or more policy benchmarks prohibiting access to one or more components of the asset. The scan assistant 710 may generate a credential for transmission to the scan engine 705 allowing the scan engine 705 to bypass the one or more policy benchmarks to execute the one or more scan operations on the asset. In some aspects, the credential may allow the scan engine 705 to bypass the one or more policy benchmarks to execute the one or more scan operations on the asset without applying one or more policy exemptions for the scan engine 705. Thus, in this case, the credential may allow the scan engine 705 to bypass the one or more policy benchmarks to execute the one or more scan operations on the asset only for the duration of the one or more scan operations. Alternatively, the credential may allow the scan engine 705 to bypass the one or more policy benchmarks to execute scan operations on the asset only for the duration of the one or more scan operations and for a period of time (e.g., an indefinite period of time, a predetermined period of time) after executing the one or more scan operations on the asset.

The scan assistant 710 may permit the scan engine 705 to execute the one or more scan operations on the asset while bypassing the one or more policy benchmarks. For example, after the scan assistant 710 transmits an indication to the gateway instructing the gateway to allow the scan engine 705 to bypass the one or more policy benchmarks to execute the one or more scan operations on the asset, the scan engine 705 may receive permission from the scan assistant 710 to execute the one or more scan operations on the asset. In some aspects, the scan engine 705 may receive an electronic message from the scan assistant 710 indicating that the scan engine 705 has permission to execute one or more scan operations on the asset. In some aspects, the scan assistant 710 may provide access for the scan engine 705 to execute the one or more scan operations on the asset.

In some aspects as described herein, no gateway may be used and instead the policy benchmark exceptions may be stored on the asset itself that was running the scan assistant and being scanned by the scan engine. For example, a policy benchmark may include that remote administrator access is prohibited. To be compliant, remote administrator access may need to be disabled. However, with traditional scan engine technology, a policy scan may need a remote administrator account to perform accurate data collection (e.g., have access to the necessary API calls on the system, and in some cases, permission to run commands as an administrator) on the asset being scanned. This may conflict with the policy benchmark and may mean that the customer would have to be non-compliant to perform a scan to determine compliance. The scan assistant may work around this because it enables access to all the necessary API calls, and remote command execution when needed, without the need to use an administrator account. In other words, the scan assistant may authenticate over TLS, and may use proprietary API's (direct data queries and/or remote command execution, and may not require the use of an operating system account, such as an administrator (WINDOWS®) or root (UNIX®) account. In some aspects, the scan assistant may provide a means to authenticate outside traditional methods and proxies scan engine API requests with optimizations when applicable to local system API's that do not require authentication, because they are local and not remote. In some aspects, an installer may configure a firewall to allow communications to work between the scan engine and scan assistant. Thus, third party devices may be used to temporarily enable access when needed (e.g., when a scan is active), and revoke that access when not needed (e.g., when a scan is not active). These concepts may be used to manage third party network devices on behalf of the client such as routers and firewalls that could be classified as "zeroconf" or "zero configuration", at least for the client, and "auto configuration" to use. Clients may provide use with credential access to their network infrastructure with sufficient permissions.

Figure 8:
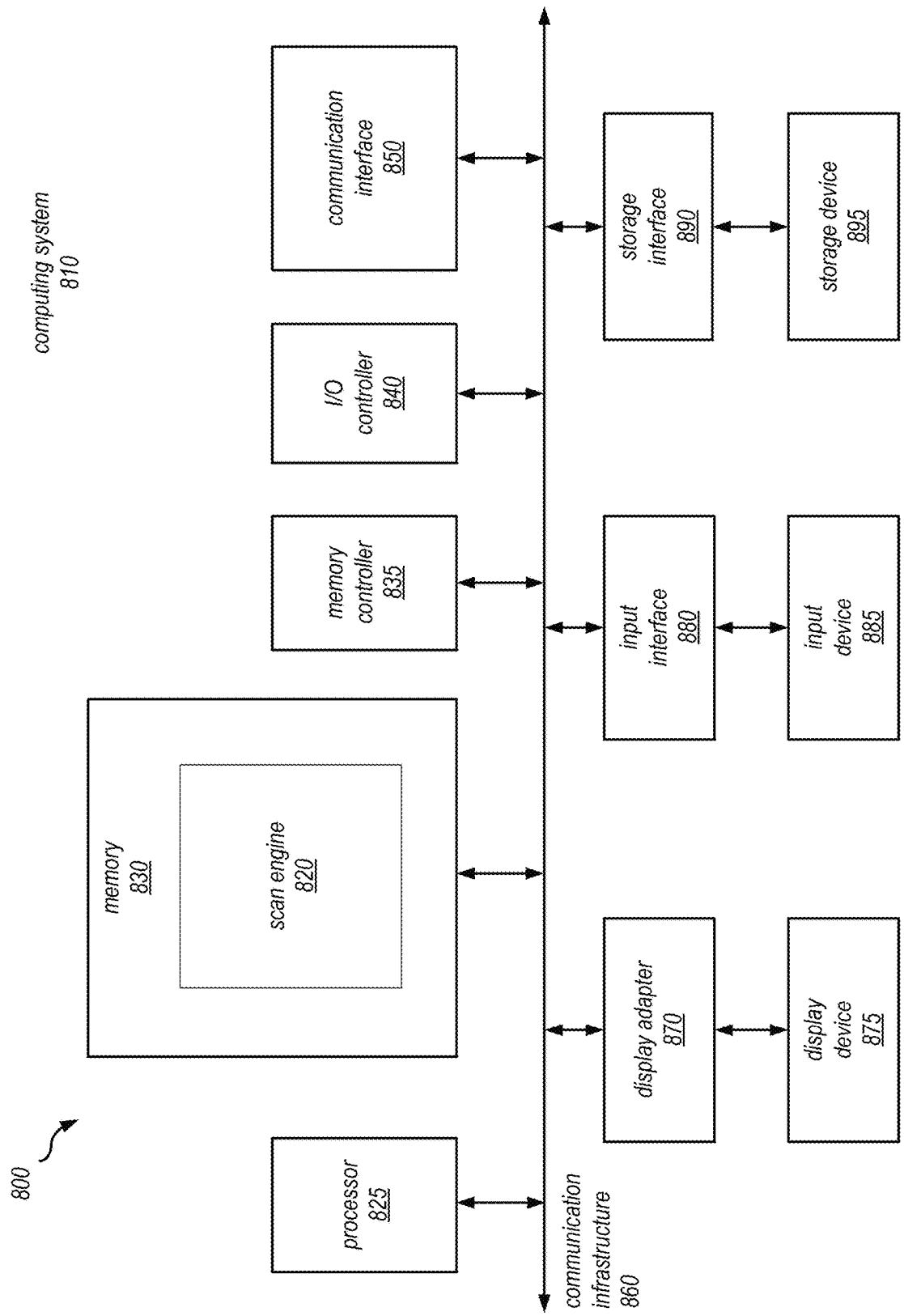
FIG. 8 is a block diagram of a computing device having a scan engine that may be used to implement asset assessment according to some aspects.

FIG. 8 is a block diagram 800 of a computing system 810 that may be used to implement asset assessment according to some aspects. The computing system 810 broadly represents a single or multi-processor computing device or system capable of executing computer-readable instructions. Examples of computing system 810 include, without limitation, any one or more of a variety of devices including workstations, personal computers, laptops, client-side terminals, servers, distributed computing systems, handheld devices, network appliances, storage controllers, and the like. In one configuration, computing system 810 may include at least one processor 825 and a memory 830. By executing the software that implements a scan engine 820, the computing system 810 becomes a special purpose computing device that is configured to perform asset assessment.

Processor 825 generally represents any type or form of processing unit capable of processing data or interpreting and executing instructions. In certain embodiments, processor 825 may receive instructions from a software application or module that may cause processor 825 to perform the functions of one or more of the embodiments described and/or illustrated herein. For example, processor 825 may perform and/or be a means for performing all or some of the operations described herein. Processor 825 may also perform and/or be a means for performing any other operations, methods, or processes described and/or illustrated herein. Memory 830 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments, computing system 810 may include both a volatile memory unit and a non-volatile storage device. In one example, program instructions implementing the scan engine 820 may be loaded into memory 830.

As shown in FIG. 8, the computing system 810 includes a scan engine 820, for example, stored on the memory 830. The scan engine 820 may include one or more electronically executable instructions that, when executed by the processor 825, may cause the processor 825 to transmit a private certificate to a scan assistant on an asset in a network, receive permission from a scan assistant on an asset of a network to execute one or more scan operations on the asset, execute one or more scan operations on the asset, receive, from an administrator device, a private administrator certificate indicating one or more signed scan operations authorized for execution on an asset, and/or transmit, to a scan assistant, a private client certificate, the private administrator certificate, and one or more scan operations that the scan engine seeks to execute on an asset associated with a scan assistant. The scan engine 802 may be the same as or at least similar to the scan engine 120 illustrated in FIG. 1, the scan engine 305 illustrated in FIGS. 3A and 3B, the scan engine 405 illustrated in FIG. 4, the scan engine 545 illustrated in FIG. 5, the scan engine 605 illustrated in FIG. 6, and the scan engine 705 illustrated in FIG. 7.

In certain embodiments, computing system 810 may also include one or more components or elements in addition to processor 825 and/or memory 830. For example, as shown, computing system 810 may include a memory controller 835, an Input/Output (I/O) controller 840, and a communication interface 850, each of which may be interconnected via a communication infrastructure. Communication infrastructure 860 generally represents any type or form of infrastructure capable of facilitating communication between one or more components of a computing device. Examples of communication infrastructure 860 include, without limitation, a communication bus (such as an Industry Standard Architecture (ISA), Peripheral Component Interconnect (PCI), PCI express (PCIe), or similar bus) and a network.

Memory controller 835 generally represents any type/form of device capable of handling memory or data or controlling communication between one or more components of computing system 810. In certain embodiments memory controller 835 may control communication between processor 825, memory 830, and I/O controller 840 via communication infrastructure 860, and may perform and/or be a means for performing, either alone or in combination with other elements, one or more of the operations or features described and/or illustrated herein. I/O controller 840 generally represents any type or form of module capable of coordinating and/or controlling the input and output functions of a computing device. For example, in certain embodiments I/O controller 840 may control or facilitate transfer of data between one or more elements of computing system 810, such as processor 825, memory 830, communication interface 850, display adapter 870, input interface 880, and storage interface 890.

Communication interface 850 broadly represents any type/form of communication device/adapter capable of facilitating communication between computing system 810 and other devices and may facilitate communication between computing system 810 and a private or public network. Examples of communication interface 850 include, a wired network interface (e.g., network interface card), a wireless network interface (e.g., a wireless network interface card), a modem, and any other suitable interface. Communication interface 850 may provide a direct connection to a remote server via a direct link to a network, such as the Internet, and may also indirectly provide such a connection through, for example, a local area network. Communication interface 850 may also represent a host adapter configured to facilitate communication between computing system 810 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 810 may also include at least one display device 875 coupled to communication infrastructure 860 via a display adapter 870 that generally represents any type or form of device capable of visually displaying information forwarded by display adapter 870. Display adapter 870 generally represents any type or form of device configured to forward graphics, text, and other data from communication infrastructure 860 (or from a frame buffer, as known in the art) for display on display device 875. Computing system 810 may also include at least one input device 885 coupled to communication infrastructure 860 via an input interface 880. Input device 885 generally represents any type or form of input device capable of providing input, either computer or human generated, to computing system 810. Examples of input device 885 include a keyboard, a pointing device, a speech recognition device, or any other input device.

Computing system 810 may also include storage device 895 coupled to communication infrastructure 860 via a storage interface 890. Storage device 895 generally represents any type or form of storage devices or mediums capable of storing data and/or other computer-readable instructions. For example, storage device 895 may include a magnetic disk drive (e.g., a so-called hard drive), a floppy disk drive, a magnetic tape drive, an optical disk drive, a flash drive, or the like. Storage interface 890 generally represents any type or form of interface or device for transmitting data between storage device 895, and other components of computing system 810. Storage device 895 may be configured to read from and/or write to a removable storage unit configured to store computer software, data, or other computer-readable information. Examples of suitable removable storage units include a floppy disk, a magnetic tape, an optical disk, a flash memory device, or the like. Storage device 895 may also include other similar structures or devices for allowing computer software, data, or other computer-readable instructions to be loaded into computing system 810. For example, storage device 895 may be configured to read and write software, data, or other computer-readable information. Storage device 895 may also be a part of computing system 810 or may be separate devices accessed through other interface systems.

Many other devices or subsystems may be connected to computing system 810. Conversely, all of the components and devices illustrated in the figure need not be present to practice the embodiments described and/or illustrated herein. The devices and subsystems referenced above may also be interconnected in different ways from that shown in the figure. Computing system 810 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 810 for storage in memory via a network such as the Internet or upon a carrier medium.

The computer-readable medium containing the computer program may be loaded into computing system 810. All or a portion of the computer program stored on the computer-readable medium may then be stored in memory 830, and/or various portions of storage device 895. When executed by processor 825, a computer program loaded into computing system 810 may cause processor 825 to perform and/or be a means for performing the functions of one or more of the embodiments described/illustrated herein. Alternatively, one or more of the embodiments described and/or illustrated herein may be implemented in firmware and/or hardware.

Figure 9:
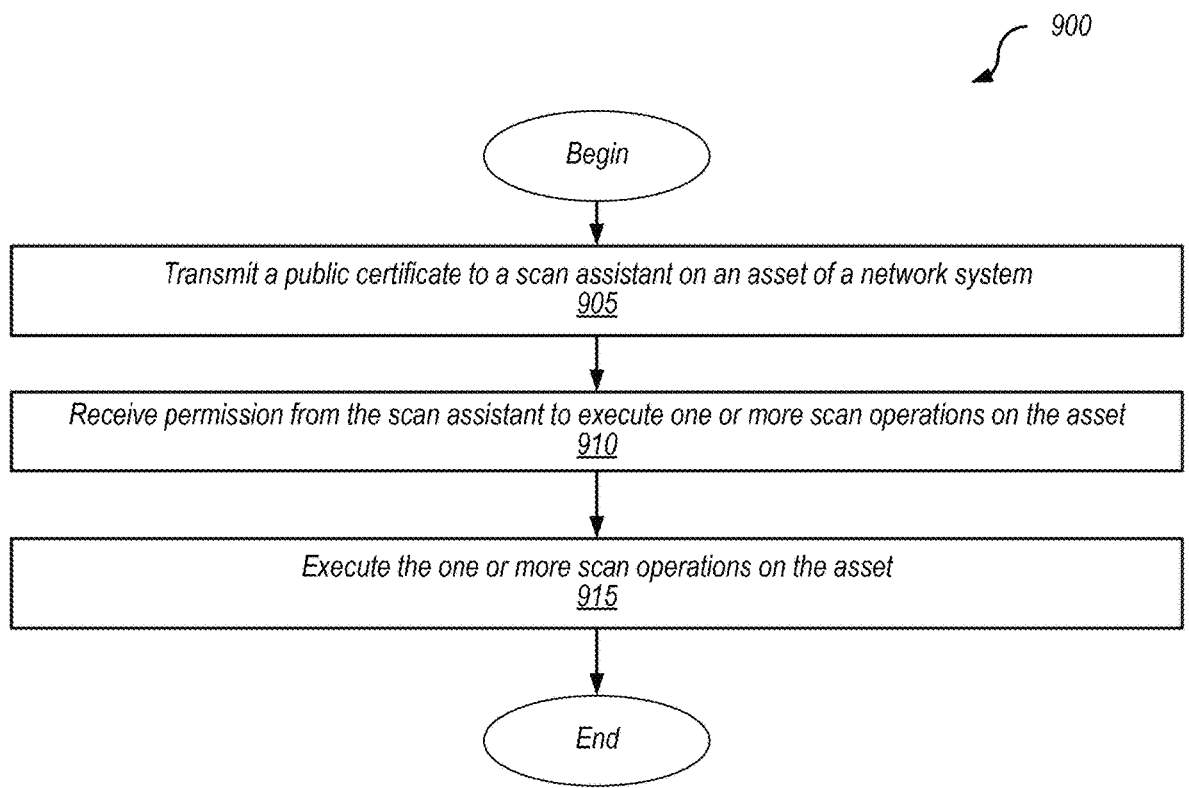
FIG. 9 shows a flowchart illustrating a process implemented by a scan engine on a computing device for performing asset assessment, signed command asset assessment, and/or asset assessment on an asset with policy exemptions according to some aspects.

FIG. 9 shows a flowchart illustrating a process 900 implemented by a scan engine on a computing system for performing asset assessment according to some aspects. The scan engine on the computing system may be the scan engine 820 on the computing system 810 illustrated in FIG. 8.

At block 905, the scan engine 820 may transmit a public certificate to a scan assistant on an asset of a network system. In some aspects, the public certificate may be generated by the scan engine 820 for authentication with the scan assistant for the scan engine 820 to execute the one or more scan operations of the asset. Alternatively, the public certificate may be stored with the scan engine 820 during installation of the scan engine 820 on the computing system 810 for subsequent use by the scan engine 820, for example, with the scan assistant. Alternatively, the public certificate may be provided to the scan engine 820 when the scan engine 820 is asked to run a scan of one or more IP addresses and/or domain names (e.g. scan one or more assets/devices/nodes on one or more networks). Alternatively, the public certificate may be requested by the scan engine 820 from a local and/or remote certificate store (e.g. the NEXPOSE®/INSIGHTVM® console) when the scan engine 820 is asked to run a scan of one or more IP addresses and/or domain names. The scan engine 820 may transmit the public certificate to the scan assistant so that the scan assistant may perform one-way authentication of the scan engine 820 to perform one or more scan operations on the asset. In some aspects, as described herein, the scan assistant may authenticate the scan engine 820 to execute one or more scan operations on the asset after (e.g., in response to) receiving a public certificate from the scan engine 820.

At block 910, the scan engine 820 may receive permission from the scan assistant to execute one or more scan operations on the asset. For example, upon receiving the public certificate from the scan engine 820, the scan assistant may verify the public certificate received from the scan engine 820 with a public certificate stored in memory or on the file system encrypted or unencrypted on the asset associated with (e.g. running) the scan assistant and determine or verify that the public certificate from the scan engine 820 was signed by the private key paired with the public certificate stored in memory or on the file system encrypted or unencrypted on the asset associated with (e.g. running) the scan assistant. Based on determining or verifying that the public certificate was signed by the private key paired with the public certificate stored in memory or on the file system encrypted or unencrypted on the asset associated with (e.g. running) the scan assistant, the scan assistant may authenticate the scan engine 820 to execute one or more scan operations on the asset. After the scan assistant authenticates the scan engine 820 to execute the one or more scan operations on the asset, the scan engine 820 may receive permission from the scan assistant to execute the one or more scan operations on the asset. In some aspects, the scan engine 820 may receive an electronic message from the scan assistant indicating that the scan engine 820 has permission to execute one or more scan operations on the asset. In some aspects, the scan assistant may provide access for the scan engine 820 to execute the one or more scan operations on the asset.

At block 915, the scan engine 820 may execute the one or more scan operations on the asset. For example, after the scan engine 820 receives permission from the scan assistant to execute the one or more scan operations on the asset, the scan engine 820 may execute at least one of a command or a script to execute on the asset.

Figure 10:
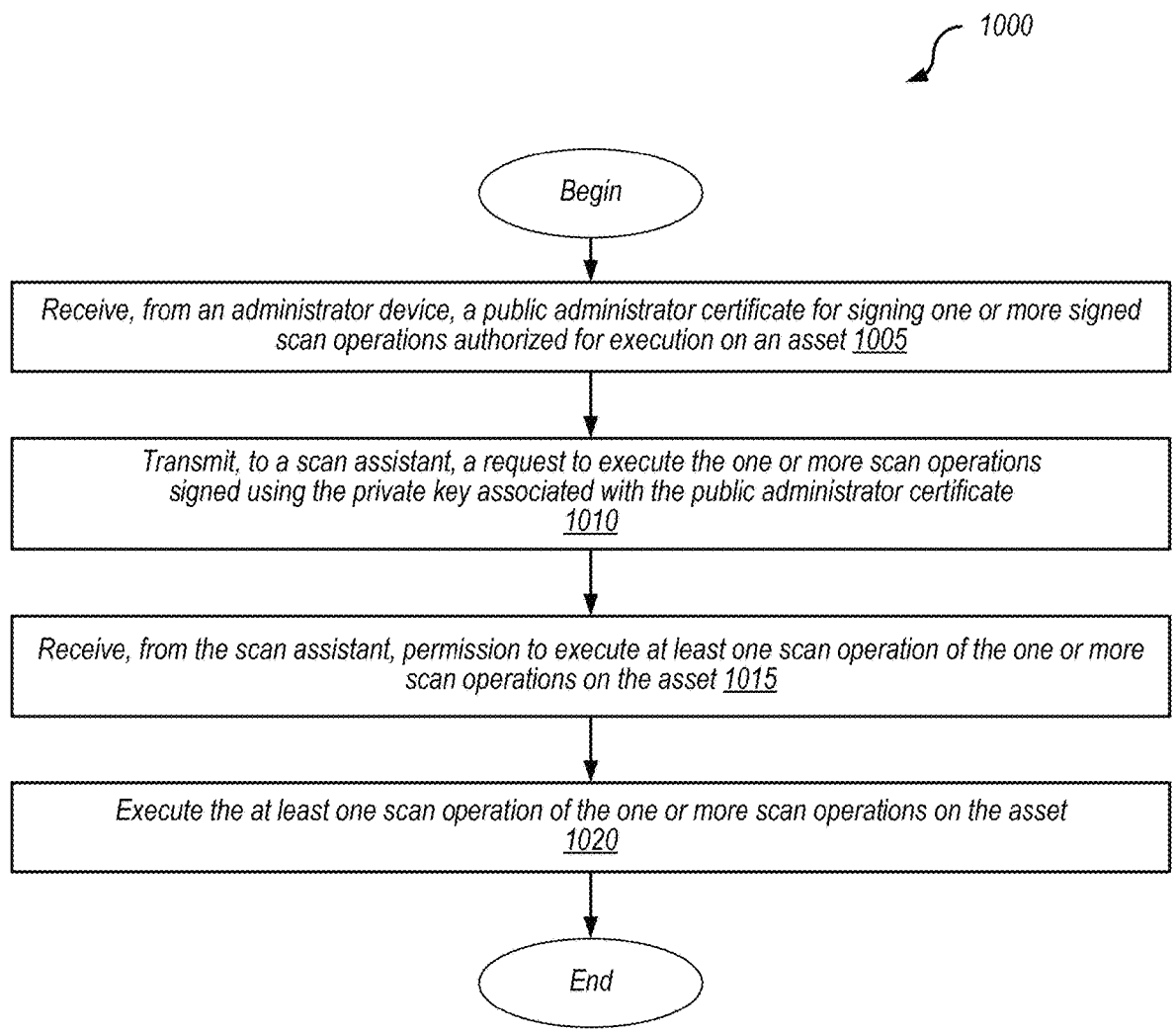
FIG. 10 shows a flowchart illustrating a process implemented by a computing system for performing asset assessment according to some aspects.

FIG. 10 shows a flowchart illustrating a process implemented by a scan engine on a computing system for performing asset assessment according to some aspects. The scan engine on the computing system may be the scan engine 820 on the computing system 810 illustrated in FIG. 8.

At block 1005, the scan engine 820 may receive, from an administrator device, a public administrator certificate for signing one or more scan operations authorized for execution on an asset. The public administrator certificate may include a private key in a key pair used to control and/or for the scan assistant to identify which scan operations (e.g., commands, scripts, and the like) the scan engine 820 is authorized to execute on the asset associated with the scan assistant. The public administrator certificate may contain the one or more signed scan operations that are authorized for execution on an asset associated with the scan assistant.

At block 1010, the scan engine 820 transmits, to a scan assistant, a request to execute the one or more scan operation signed using the private key associated with the public administrator certificate. In some embodiments, the scan assistant may be provided the public key associated with the public administrator certificate and/or the public administrator certificate itself, which can be used to verify the one or more signed scan operations. In some embodiments, the public key may be deployed with the scan assistant (e.g. pinned in the binary of the scan assistant).

At block 1015, the scan engine 820 may receive, from the scan assistant, permission to execute at least one scan operation of the one or more scan operations on the asset. The scan assistant may have identified that at least one scan operation of the one or more scan operations that the scan engine 820 seeks to execute on the asset matches at least one signed scan operation of the one or more signed scan operations verified by the public administrator certificate. Subsequently, the scan assistant may authenticate the scan engine 820 to execute the at least one scan operation of the one or more scan operations on the asset. Based on authenticating the scan engine 820 to execute the at least one scan operation of the one or more scan operations on the asset, the scan engine 820 may receive, from the scan assistant, permission to execute at least one scan operation of the one or more scan operations on the asset. In some aspects, the scan engine 820 may receive an electronic message from the scan assistant indicating that the scan engine 820 has permission to execute one or more scan operations on the asset. In some aspects, the scan assistant may provide access for the scan engine 820 to execute the one or more scan operations on the asset.

At block 1020, the scan engine 820 may execute the at least one scan operation of the one or more scan operations on the asset. For example, after the scan engine 820 receives permission from the scan assistant to execute the one or more scan operations on the asset, the scan engine 820 may execute at least one of a command or a script on the asset that matches a signed command or a signed script verified by the public administrator certificate.

Figure 11:
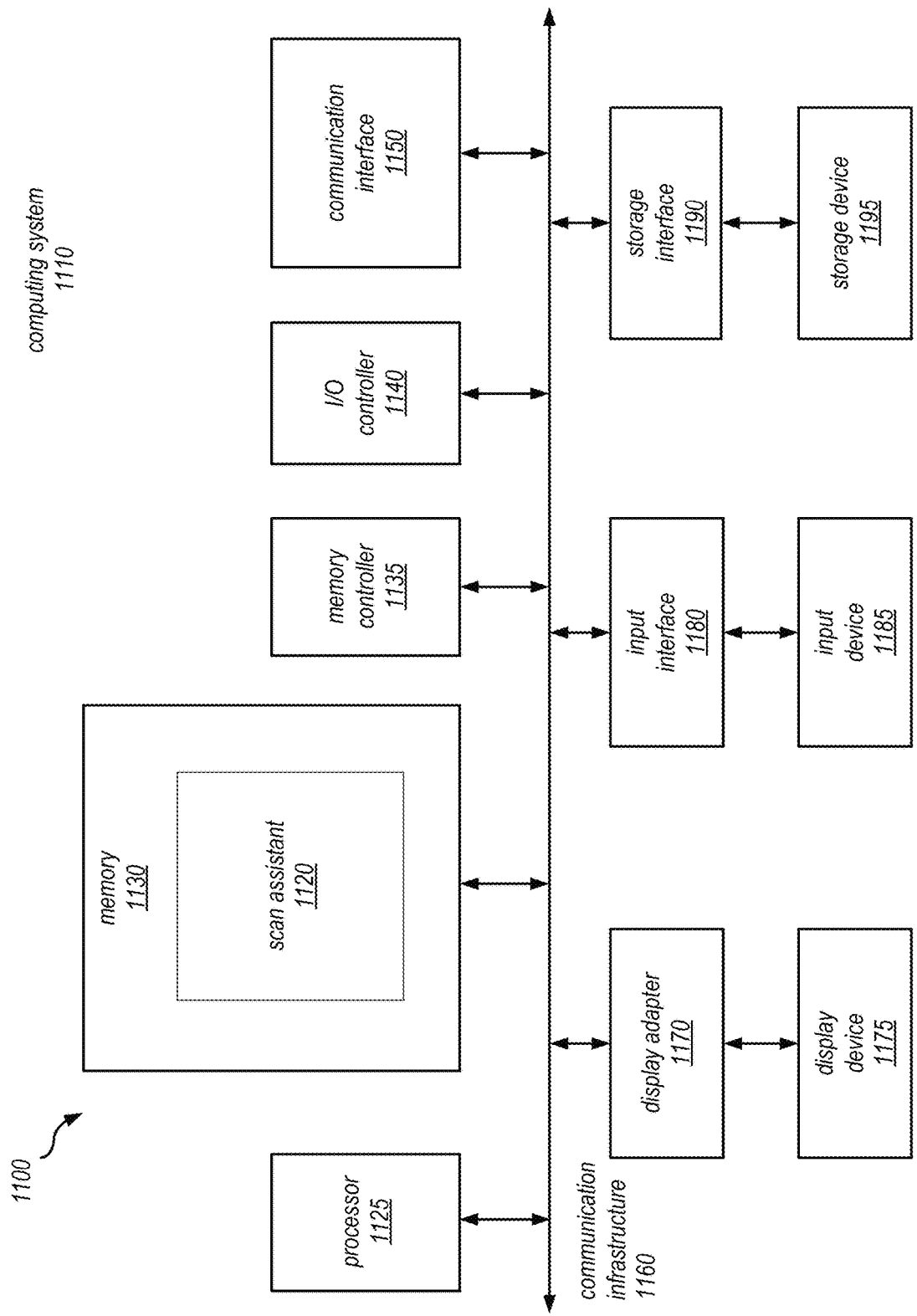
FIG. 11 is a block diagram of an asset having a scan assistant that may be used to implement asset assessment according to some aspects.

FIG. 11 is a block diagram 1100 of a computing system 1110 that may be used to implement asset assessment according to some aspects. The computing system 1110 broadly represents a single or multi-processor computing device or system capable of executing computer-readable instructions. Examples of computing system 1110 include, without limitation, any one or more of a variety of devices including workstations, personal computers, laptops, client-side terminals, servers, distributed computing systems, handheld devices, network appliances, storage controllers, and the like. In one configuration, computing system 1110 may include at least one processor 1125 and a memory 1130. By executing the software that implements a scan assistant 1120, the computing system 1110 becomes a special purpose computing device that is configured to perform asset assessment.

Processor 1125 generally represents any type or form of processing unit capable of processing data or interpreting and executing instructions. In certain embodiments, processor 1125 may receive instructions from a software application or module that may cause processor 1125 to perform the functions of one or more of the embodiments described and/or illustrated herein. For example, processor 1125 may perform and/or be a means for performing all or some of the operations described herein. Processor 1125 may also perform and/or be a means for performing any other operations, methods, or processes described and/or illustrated herein. Memory 1130 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments, computing system 1110 may include both a volatile memory unit and a non-volatile storage device. In one example, program instructions implementing the scan assistant 1120 may be loaded into memory 1130.

As shown in FIG. 11, the computing system 1110 includes a scan assistant 1120, for example, stored on the memory 1130. The scan assistant 1120 may include one or more electronically executable instructions that, when executed by the processor 1125, may cause the processor 1125 to receive an indication that the scan assistant 1120 is installed on an asset of a network system, generate a public certificate for authenticating a scan engine to execute one or more scan operations on the asset, receive, from a scan engine a private certificate, verify that the private certificate and the public certificate are a proven public-private certificate pair, authenticate a scan engine with the scan assistant 1120 to execute one or more scan operations on the asset, permit a scan engine to execute one or more scan operations on an asset, coordinate, with a scan engine, an execution of one or more scan operations on an asset, receive a public administrator certificate, receive a public administrator certificate, generate a public client certificate for authenticating a scan engine to execute one or more scan operations on an asset, verify that a private client certificate and a public client certificate are a proven public-private client certificate pair, verify that a private administrator certificate and a public administrator certificate are a proven public-private administrator certificate pair, match at least one scan operation of one or more scan operations with at least one signed scan operation of one or more signed scan operations, authenticate a scan engine to execute at least one scan operation of one or more scan operations on an asset, permit a scan engine to execute at least one scan operation of one or more scan operations on an asset, coordinate, with a scan engine, an execution of at least one scan operation of one or more scan operations on an asset, receive an indication of one or more policy benchmarks prohibiting access to an asset, receive a private certificate from a scan engine on an electronic device, generate a public certificate for authenticating a scan engine to execute one or more scan operations on an asset, verify that a private certificate and a public certificate are a proven public-private certificate pair, authenticate a scan engine with the scan assistant 1120 to execute the one or more scan operations on an asset, transmit an indication that a scan engine is permitted to bypass one or more policy benchmarks prohibiting access to an asset to execute one or more scan operations on the asset, and/or permit a scan engine to execute one or more scan operations on an asset while bypassing one or more policy benchmarks. The scan assistant 1120 may be the same as or at least similar to the scan assistant 115 illustrated in FIG. 1, the scan assistant 310 illustrated in FIGS. 3A and 3B, the scan assistant 410 illustrated in FIG. 4, the scan assistant 550 illustrated in FIG. 5, the scan assistant 610 illustrated in FIG. 6, and the scan assistant 710 illustrated in FIG. 7.

In certain embodiments, computing system 1110 may also include one or more components or elements in addition to processor 1125 and/or memory 1130. For example, as shown, computing system 1110 may include a memory controller 1135, an Input/Output (I/O) controller 1140, and a communication interface 1150, each of which may be interconnected via a communication infrastructure. Communication infrastructure 1160 generally represents any type or form of infrastructure capable of facilitating communication between one or more components of a computing device. Examples of communication infrastructure 1160 include, without limitation, a communication bus (such as an Industry Standard Architecture (ISA), Peripheral Component Interconnect (PCI), PCI express (PCIe), or similar bus) and a network.

Memory controller 1135 generally represents any type/form of device capable of handling memory or data or controlling communication between one or more components of computing system 1110. In certain embodiments memory controller 1135 may control communication between processor 1125, memory 1130, and I/O controller 1140 via communication infrastructure 1160, and may perform and/or be a means for performing, either alone or in combination with other elements, one or more of the operations or features described and/or illustrated herein. I/O controller 1140 generally represents any type or form of module capable of coordinating and/or controlling the input and output functions of a computing device. For example, in certain embodiments I/O controller 1140 may control or facilitate transfer of data between one or more elements of computing system 1110, such as processor 1125, memory 1130, communication interface 1150, display adapter 1170, input interface 1180, and storage interface 1190.

Communication interface 1150 broadly represents any type/form of communication device/adapter capable of facilitating communication between computing system 1110 and other devices and may facilitate communication between computing system 1110 and a private or public network. Examples of communication interface 1150 include, a wired network interface (e.g., network interface card), a wireless network interface (e.g., a wireless network interface card), a modem, and any other suitable interface. Communication interface 1150 may provide a direct connection to a remote server via a direct link to a network, such as the Internet, and may also indirectly provide such a connection through, for example, a local area network. Communication interface 1150 may also represent a host adapter configured to facilitate communication between computing system 1110 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 1110 may also include at least one display device 1175 coupled to communication infrastructure 1160 via a display adapter 1170 that generally represents any type or form of device capable of visually displaying information forwarded by display adapter 1170. Display adapter 1170 generally represents any type or form of device configured to forward graphics, text, and other data from communication infrastructure 1160 (or from a frame buffer, as known in the art) for display on display device 1175. Computing system 1110 may also include at least one input device 1185 coupled to communication infrastructure 1160 via an input interface 1180. Input device 1185 generally represents any type or form of input device capable of providing input, either computer or human generated, to computing system 1110. Examples of input device 1185 include a keyboard, a pointing device, a speech recognition device, or any other input device.

Computing system 1110 may also include storage device 1195 coupled to communication infrastructure 1160 via a storage interface 1190. Storage device 1195 generally represents any type or form of storage devices or mediums capable of storing data and/or other computer-readable instructions. For example, storage device 1195 may include a magnetic disk drive (e.g., a so-called hard drive), a floppy disk drive, a magnetic tape drive, an optical disk drive, a flash drive, or the like. Storage interface 1190 generally represents any type or form of interface or device for transmitting data between storage device 1195, and other components of computing system 1110. Storage device 1195 may be configured to read from and/or write to a removable storage unit configured to store computer software, data, or other computer-readable information. Examples of suitable removable storage units include a floppy disk, a magnetic tape, an optical disk, a flash memory device, or the like. Storage device 1195 may also include other similar structures or devices for allowing computer software, data, or other computer-readable instructions to be loaded into computing system 1110. For example, storage device 1195 may be configured to read and write software, data, or other computer-readable information. Storage device 1195 may also be a part of computing system 1110 or may be separate devices accessed through other interface systems.

Many other devices or subsystems may be connected to computing system 1110. Conversely, all of the components and devices illustrated in the figure need not be present to practice the embodiments described and/or illustrated herein. The devices and subsystems referenced above may also be interconnected in different ways from that shown in the figure. Computing system 1110 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1110 for storage in memory via a network such as the Internet or upon a carrier medium.

The computer-readable medium containing the computer program may be loaded into computing system 1110. All or a portion of the computer program stored on the computer-readable medium may then be stored in memory 1130, and/or various portions of storage device 1195. When executed by processor 1125, a computer program loaded into computing system 1110 may cause processor 1125 to perform and/or be a means for performing the functions of one or more of the embodiments described/illustrated herein. Alternatively, one or more of the embodiments described and/or illustrated herein may be implemented in firmware and/or hardware.

Figure 12:
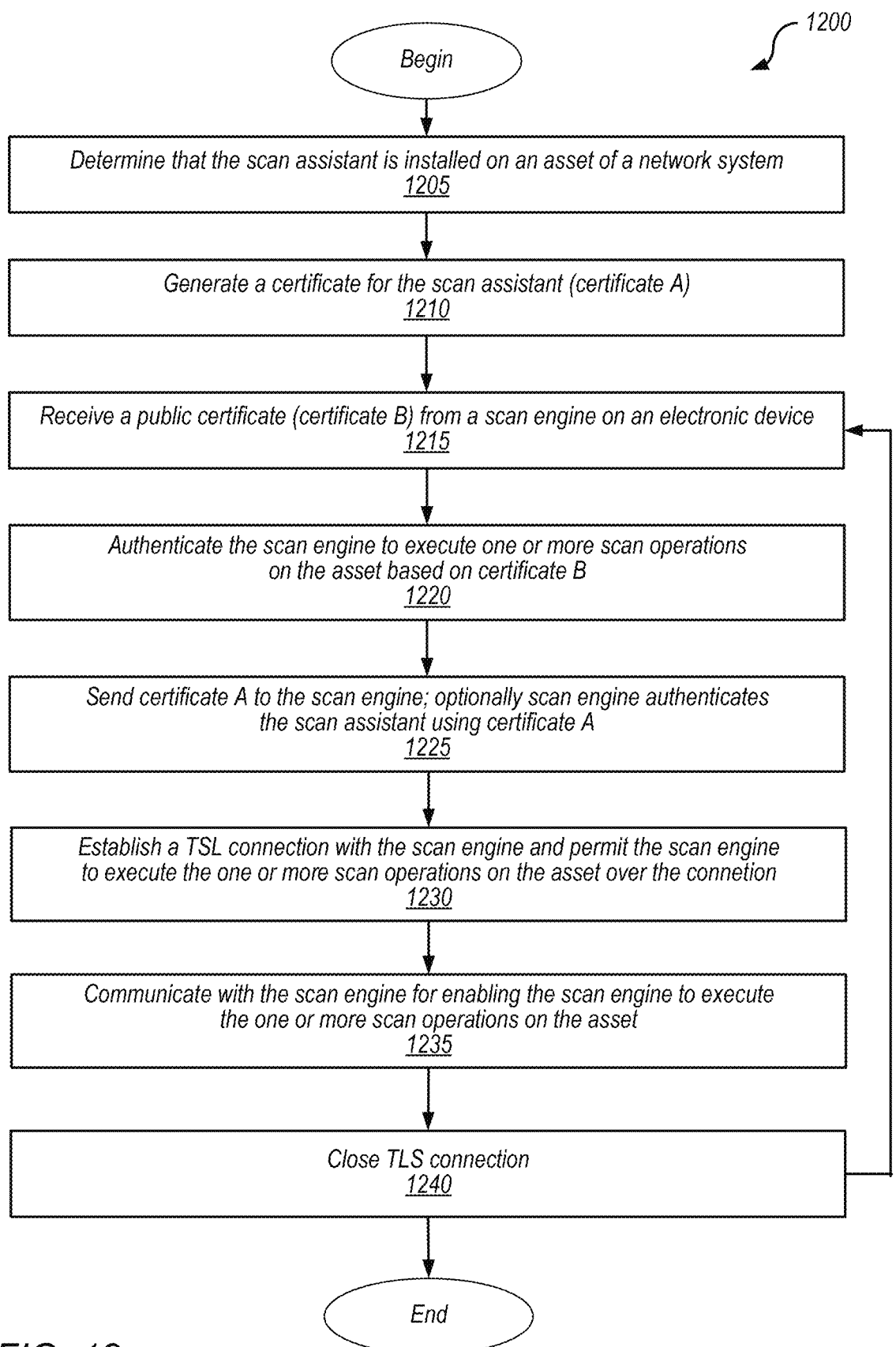
FIG. 12 shows a flowchart illustrating a process implemented by a scan assistant on an asset for performing asset assessment according to some aspects.

FIG. 12 shows a flowchart illustrating a process 1200 implemented by a scan assistant on computing system for performing asset assessment according to some aspects. The scan assistant on the computing system may be the scan assistant 1120 on the computing system 1110 illustrated in FIG. 11. In some aspects, the computing system 1110 may be an asset associated with the scan assistant 1120.

At block 1205, the scan assistant 1120 may determine that the scan assistant 1120 is installed on an asset of a network system. The asset may include at least one computing resource. For example, the scan assistant 1120 may determine that the scan assistant 1120 is installed on an asset of a network system in response to installing the scan assistant 1120 on the asset of the network system. As another example, the scan assistant 1120 may determine that the scan assistant 1120 is installed on an asset of a network system when the asset of the network system is powered on or activated for operation.

At block 1210, the scan assistant 1120 may generate a certificate (certificate A). For example, the scan assistant 1120 may generate certificate A after (e.g., in response to) determining that the scan assistant 1120 is installed on the asset of the network system. As another example, the scan assistant 1120 may generate the certificate after (e.g., in response to) a reboot of the asset, a restart of the scan assistant service, or receiving a public certificate from the scan engine as described herein.

At block 1215, the scan assistant 1120 may receive a public certificate (certificate B) from a scan engine. In some embodiments, certificate B may be received as part of a request from the scan engine to establish a TLS connection. The scan assistant 1120 may receive certificate B from the scan engine for determining a state of the asset. In some aspects, the public certificate may be previously generated by the owner of the asset for authentication with the scan assistant 1120 to allow the scan engine to execute the one or more scan operations on the asset. In some aspects, the public certificate may be generated on behalf of an asset owner for authentication with the scan assistant 1120 to allow the scan engine to execute the one or more scan operations on the asset. Alternatively, one or more public certificates may be stored with the scan engine during installation or configured after installation of the scan engine on the electronic device for subsequent use by the scan engine, for example, with the scan assistant 1120. Alternatively, one or more public certificates may be provided to or requested by the scan engine for use by the scan engine, for example, with the scan assistant 1120, when the scan engine is asked to scan one or more IP addresses and/or domain names.

At block 1220, the scan assistant 1120 may authenticate the scan engine to execute the one or more scan operations on the asset based on certificate B. For example, upon receiving the public certificate B from the scan engine, the scan assistant 1120 may check to verify that the certificate was signed using a private key held by the scan engine. As another example, upon receiving the public certificate B from the scan engine, the scan assistant 1120 may check to verify that the certificate was signed using a private key associated with a certificate authority. If the public certificate B is verified, the process 1200 may continue to block 1225. If the public certificate B cannot be verified, the scan assistant 1120 may prohibit or prevent the scan engine from executing one or more scan operations on the asset and the process 1200, for example, by denying the TLS connection request.

At block 1225, the scan assistant 1120 may send its own certificate A to the scan engine. In some embodiments, the scan engine may authenticate the scan assistant based on certificate A, for example, by using a public certificate associated with certificate A that was previously passed to the scan engine. In some embodiments, the scan engine will not attempt to verify certificate A, so that a TLS connection can be established between the scan engine and scan assistant based on a one-way certificate authentication process. As discussed, this process is sufficient in most situations as long as the scan assistant is able to verify the identity of the scan engine.

At block 1230, the scan assistant 1120 establishes a TLS connection with the scan engine and permits the scan engine to execute the one or more scan operations on the asset. After the scan assistant 1120 authenticates the scan engine to execute the one or more scan operations on the asset, the scan assistant 1120 may allow the scan engine to execute the one or more scan operations on the asset by establishing the TLS connection. In some aspects, the scan assistant may send an electronic message to the scan engine indicating that the scan engine has permission to execute one or more scan operations on the asset. In some aspects, the scan assistant 1120 may provide access for the scan engine to execute the one or more scan operations on the asset. As discussed, the one or more scan operations may request data from the asset, query for information about the asset, cause one or more commands to be executed on the asset, or cause one or more scripts to be executed on the asset according to a communications protocol.

At block 1235, the scan assistant 1120 may communicate with the scan engine according to the communications protocol to assist the scan engine with executing the one or more scan operations on the asset. For example, after the scan engine receives permission from the scan assistant 1120 to execute the one or more scan operations on the asset, the scan assistant 1120 may assist the scan engine with the execution of one or more commands and/or one or more scripts on the asset to collect and compile information requested by the scan engine. As another example, the scan assistant 1120 may communicate with the scan engine for enabling the scan engine to execute the one or more scan operations on the asset.

In some aspects, after the scan assistant 1120 authenticates the scan engine with the scan assistant 1120 to execute the one or more scan operations on the asset and after the scan engine, in cooperation with the scan assistant 1120, executes the one or more scan operations on the asset, the scan assistant 1120 may determine that the scan engine 505 may remain authenticated to execute additional scan operations on the asset. Alternatively, in some aspects, after the scan engine, in cooperation with the scan assistant 1120, executes the one or more scan operations of the asset, the scan assistant 1120 may determine that the scan engine is no longer authenticated with the scan assistant 1120 to execute additional scan operations on the asset without performing another authentication procedure. For example, either the scan assistant or the scan engine may close 1240 the TLS connection once the results of the scan operations have been returned. The scan engine will then need to reauthenticate itself to the scan assistant to perform any additional scan operations, for example, by attempting to establish another TLS connection.

Figure 13:
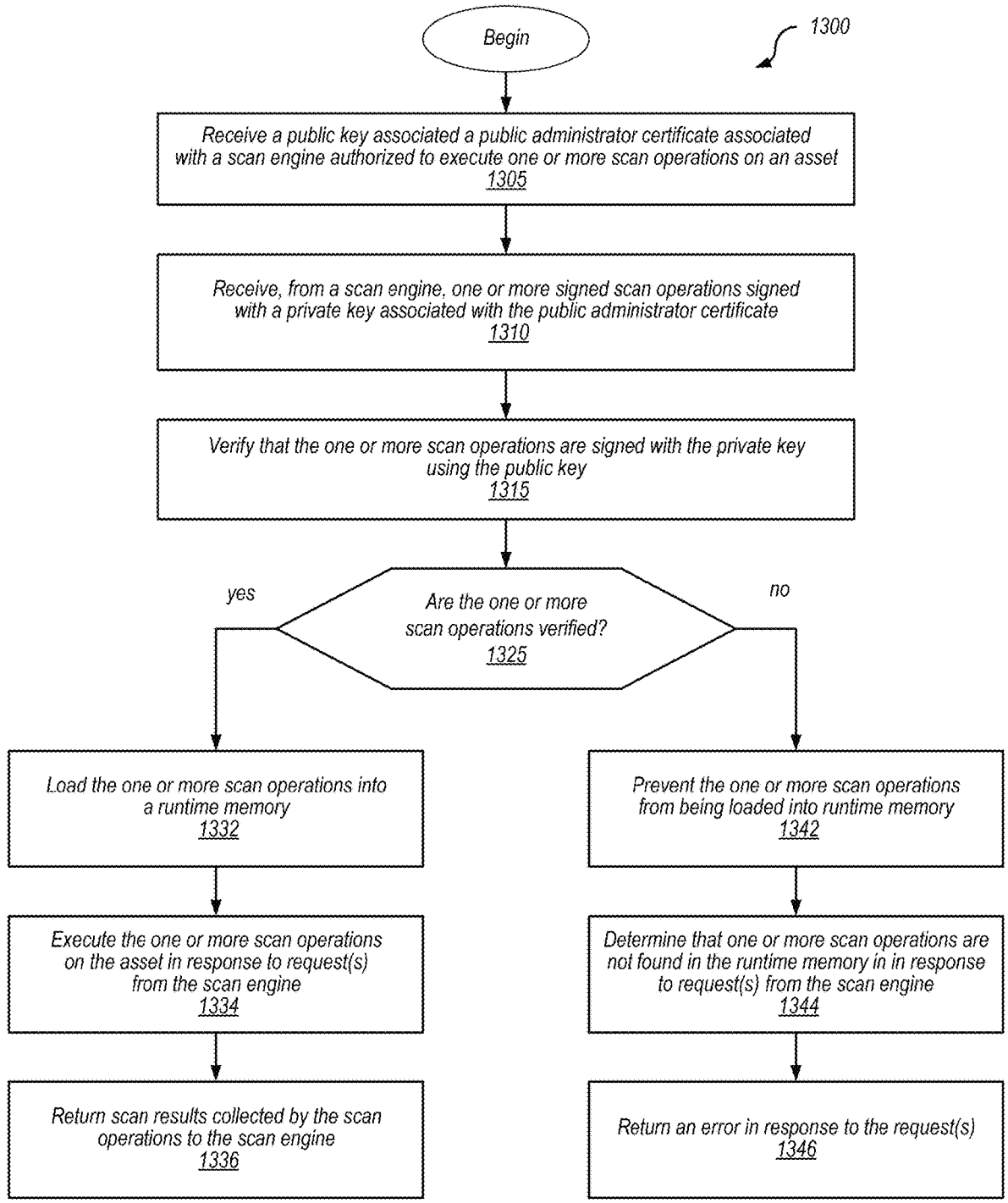
FIG. 13 shows a flowchart illustrating a process implemented by a scan assistant on an asset for performing signed command asset assessment according to some aspects.

FIG. 13 shows a flowchart illustrating a process 1300 implemented by a scan assistant on the computing system for performing asset assessment according to some aspects. The scan assistant on the computing system may be the scan assistant 1120 on the computing system 1110 illustrated in FIG. 11. In some aspects, the computing system 1110 may be an asset associated with the scan assistant 1120.

At operation 1305, the scan assistant 1120 receives a public key associated with a public administrator certificate associated with a scan engine that is authorized to execute scan operations on an asset. In some embodiments, the public administrator certificate may be generated on an administrator device, and the private key associated with the public administrator certificate is provided to the scan engine to sign scan operations. In some embodiments, the public key may be deployed with or stored with the scan assistant, for example, pinned in an executable binary of the scan assistant.

At operation 1310, the scan assistant receives from the scan engine one or more signed scan operations signed using a private key associated with the public administrator certificate. In some embodiments, each scan operation may be signed individually. In some embodiments, a collection of multiple scan operations may be signed together as a group. In some embodiments, the scan operations may be provided in a key-value map that associate each scan operation to a unique identifier, and the key-value map may be signed using the private key. In some embodiments, the scan operations may be received over an encrypted connection such as a TLS connection, which may be established after the scan assistant authenticates the scan engine.

At operation 1315, the scan assistant 1120 verifies that the one or more scan operations are signed with the private key using its public key. For example, the scan assistant may perform a cryptographic operation on the received payload to confirm that the resulting data structure is in an expected form. As shown at operation 1325, if the one or more scan operations are successfully verified, the process proceeds to operation 1332. If not, the process proceeds to operation 1342.

At operation 1332, the scan assistant loads the one or more verified scan operations into a runtime memory, so that they can be remotely invoked by the scan engine during a scan of the asset. In some embodiments, the key-value map may be loaded into memory so that the scan assistant can look up individual scan operations by their unique identifier.

At operation 1334, in response to request(s) from the scan engine, the scan assistant executes the one or more scan operation according to the request(s). In some embodiments, the scan engine request(s) may be submitted via an API of the scan assistant and according to a communication protocol between the scan engine and the scan assistant. The request(s) may specify a sequence of command or scan operation identifiers to be executed, and the scan assistant will look up the scan operations requested in its runtime memory and execute the operations in the order specified.

At operation 1336, the scan assistant returns the scan results collected by the scan operations after execution. The scan results may indicate a state of the asset, and are returned to the scan engine according to the API or the communication protocol. In some embodiments, the scan results may be analyzed by the scan engine and cause the scan engine to submit additional requests and/or signed scan operations for additional data to be collected from the asset.

At operation 1342, if the one or more signed scan operations are not verified, the scan assistant will prevent the one or more scan operations from being loaded into its runtime memory. Thus, the one or more scan operations cannot be invoked by the scan engine during a scan of the asset. In some embodiments, if only some scan operations in a received collection can be verified (e.g. if the operations are signed individually using different private keys), the remaining scan operations are still loaded for later use. In some embodiments, if some operations in a collection cannot be verified, the entire collection is discarded.

At operation 1334, in response to receiving request(s) from the scan engine invoking the one or more unverified scan operations, the scan assistant will determine that the unverified scan operations cannot be found in its runtime memory. As discussed, the scan engine request(s) may specify the identifiers associated with the scan operations and the scan assistant may use the identifiers to look up the operations in its memory-resident key-value map. The look up operation will indicate that some of the scan operations identifiers have no associated operations in the key-value map.

At operation 1346, one or more errors are returned to the scan engine in response to the request(s), indicating that at least some of the requested scan operations were not found. In some embodiments, if some scan operations in a requested sequence of operations were not found, the scan assistant may prevent the entire requested sequence from executing. In other embodiments, the scan assistant may execute those scan operations that can be found in memory, and return scan results obtained from such operations, and indicate an "operation not found" error for those operations that were not found in memory.

Figure 14:
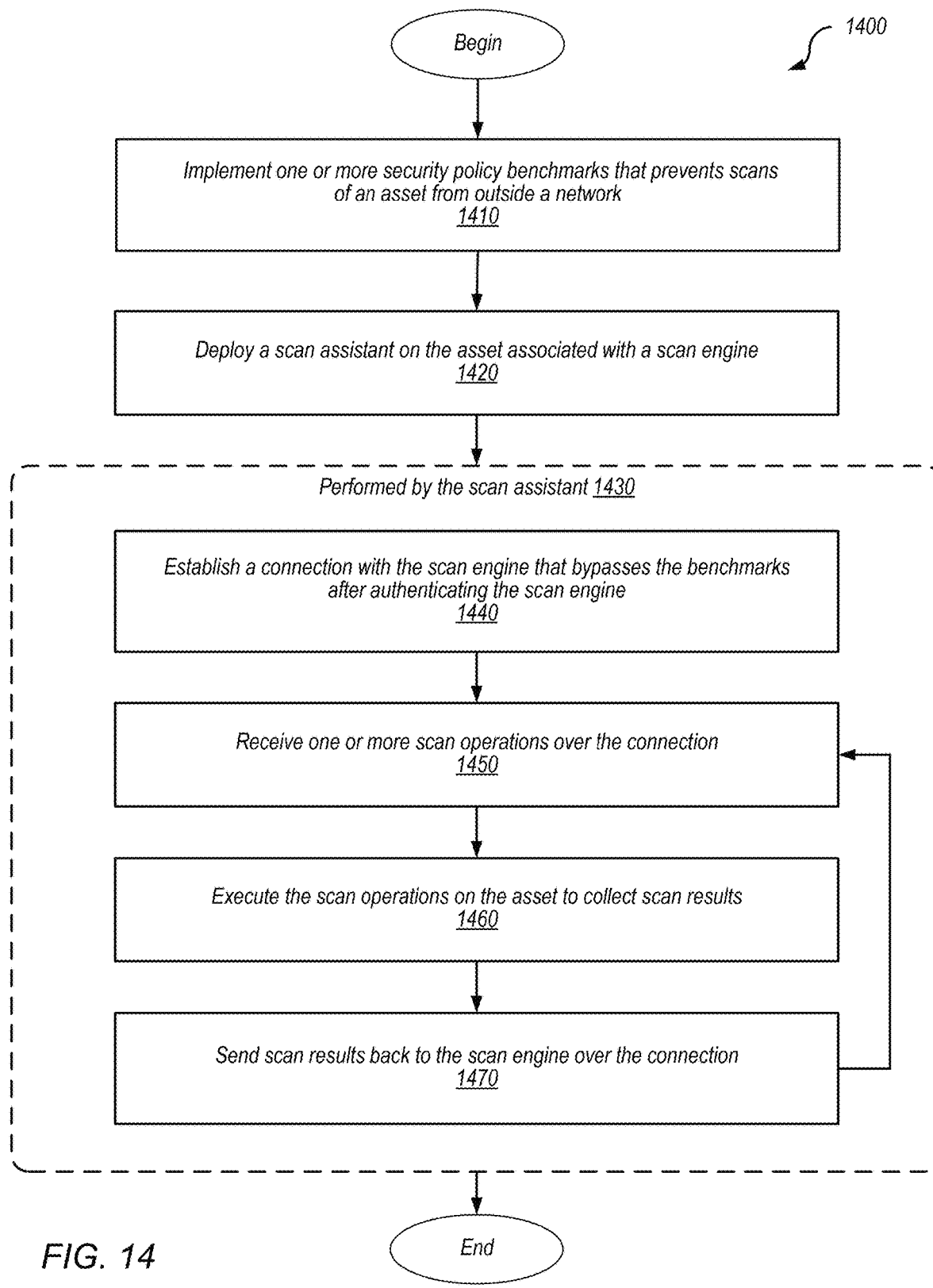
FIG. 14 shows a flowchart illustrating a process implemented by an asset for performing asset assessment on an asset with policy exemptions according to some aspects.

FIG. 14 shows a flowchart illustrating a process 1400 implemented by a computing system for performing asset assessment according to some aspects. The scan assistant on the computing system may be the scan assistant 1120 on the computing system 1110 illustrated in FIG. 11. In some aspects, the computing system 1110 may be an asset associated with the scan assistant 1120.

At block 1410, the asset implements one or more security policy benchmarks that prevents scans of the asset from outside a network where the asset resides. The security policy benchmarks may be implemented by security administrators of the network. For example, the policy benchmarks may prohibit all remote access or connections to certain types of services on the asset (e.g. WMI or SMB/CIFS services on WINDOWS machines). As another example, the policy benchmarks may prohibit remote access of connection to the asset using an administrative credential (e.g. as a system administrator). As another example, the policy benchmarks may permit connection to the asset, but restrict the operations that the remote user can perform on the asset (e.g. as configured via WINDOWS user account control (UAC) settings). The policy benchmarks can interfere with or prevent a remote scanning process from the scan engine 705 (e.g. prevent execution of one or more scanning operations).

At block 1420, the scan assistant 1120 is deployed or installed on the asset. The scan assistant is associated with the scan engine, which may reside outside the network. In some embodiments, the scan assistant may be provided by the operator of the scan engine and deployed via an administrative device. The scan assistant may be configured with a public key that can be used to authenticate requests signed by the scan engine. In some embodiments, once installed, the scan assistant may be launched or executed on the asset as a service, and periodically connect with the scan engine to perform scans of the asset. The scan assistant 710 may execute as an authenticated administrator user on the asset, so that it is able to execute all scan operations requested by the scan engine. No exceptions or changes to the policy benchmarks are needed to allow scan operations to be executed on the asset.

In some aspects, the scan engine may be within a network of the asset associated with the scan assistant 1120. In this case, the one or more policy benchmarks may prohibit access to the asset by other components including the scan engine that are local on the network of the asset. In some aspects, the scan engine may be outside of a network of the asset associated with the scan assistant 1120. In this case, the one or more policy benchmarks may prohibit access to the asset by components including the scan engine that are remote outside the network of the asset. In some aspects, the one or more policy benchmarks may prohibit access to the asset by other components including the scan engine regardless of whether the other components including the scan engine are local on the network of the asset or remote outside the network of the asset.

As shown, operations 1440 to 1470 are performed 1430 by the scan assistant executing on the asset, for example, as part of a scan of the asset. At block 1440, the scan assistant establishes a connection between the scan engine and the scan assistant. In some embodiments, the scan engine is authenticated prior to the connection being established, for example, using a one-way or two-way authentication process as discussed in connection with FIG. 4. The connection may be a TLS connection and, depending on the embodiment, either the scan engine or the scan assistant may initiate the connection by sending the initial connection request.

At operation 1450, the scan assistant receives, from the scan engine and over the connection, one or more scan operations to perform as part of a scan of the asset. As discussed, the scan operation may be received via a specialized communication protocol (e.g. a purely binary protocol) implemented between the scan engine and the scan assistant. The scan operations may indicate individual commands or scripts that are executable on the asset. In some embodiments, the scan operations, either individually or as a collection, may be signed by the scan engine using a second signing key and verified by the scan assistant to provide a second layer of security during the scanning process.

At operation 1460, the scan assistant executes the scan operations on the asset and collects the scan results. The scan results may include various types of data about the asset such as file system contents, configuration states, operation states, system events, performance statistics or metrics, etc. At operation 1470, the scan results are sent back to the scan engine over the connection. In this manner, use of the connection between the scan engine and the scan assistant bypasses the policy benchmarks implemented on the asset, allowing a variety of scan operations to be performed on the asset from a trusted scan engine without having to create exceptions in the security policies. As shown, the scan process may involve the scan assistant receiving multiple sets of instructions or scan operations from the scan engine and sending back the results. Thus, the scan engine may interrogate the scan assistant about the state of the asset in stages.

Figure 15:
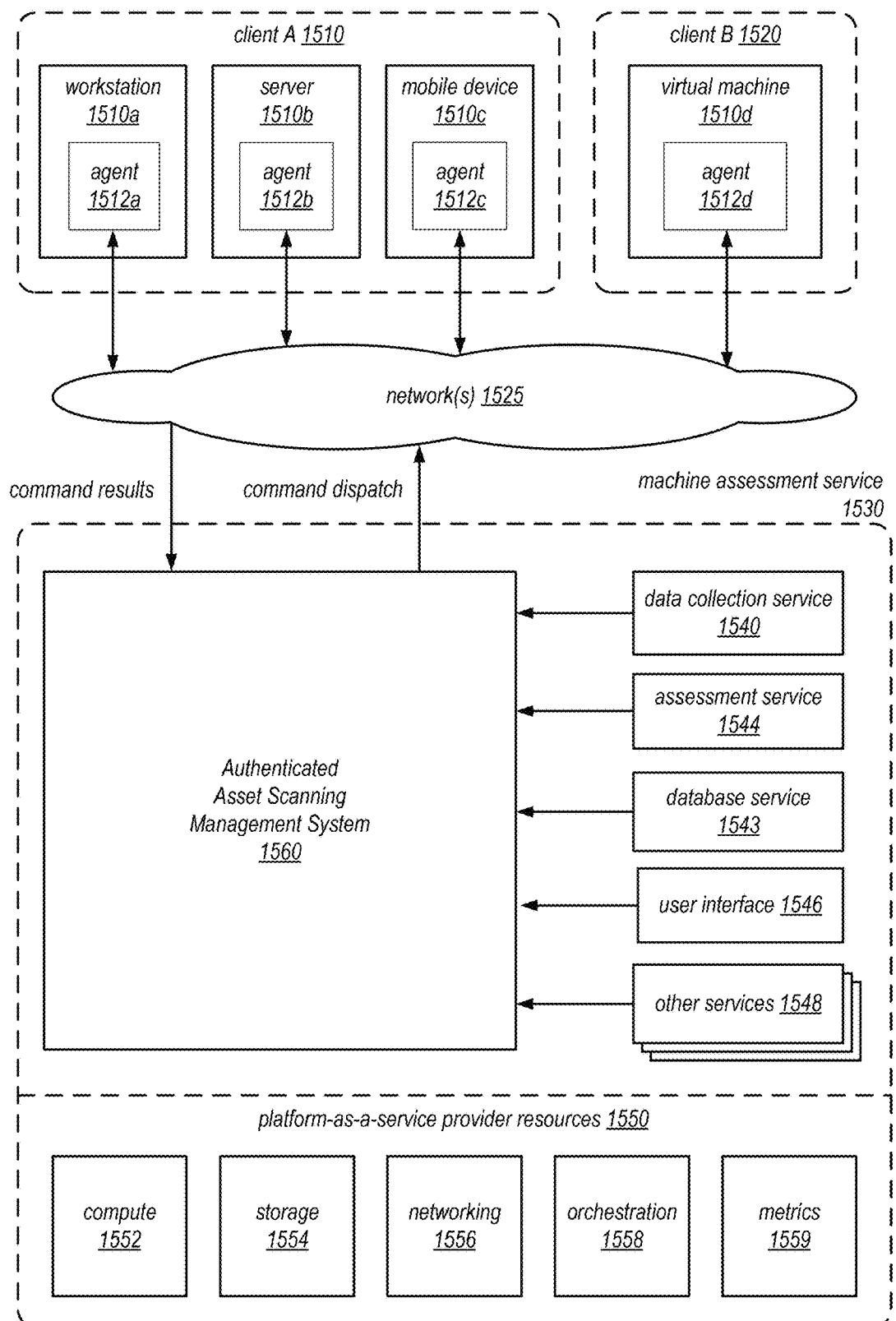
FIG. 15 is a block diagram illustrating an authenticated asset scanning management system that is implemented as part of a machine assessment service, which is in turn implemented in a platform-as-a-service provider network that contains platform-as-a-service resources, according to some aspects.

FIG. 15 is a block diagram illustrating an authenticated asset scanning management system 1560 (e.g., scan engine 120 of FIG. 1, scan engine 205 of FIG. 2, scan engine 205 of FIGS. 3A and 3B, scan engine 405 of FIG. 4, scan engine 545 of FIG. 5, scan engine 605 of FIG. 6, scan engine 705 of FIG. 7, scan engine 820 of FIG. 8) that is implemented as part of a machine assessment service 1530, which is in turn implemented in a platform-as-a-service provider network that contains platform-as-a-service resources 1550, according to some embodiments.

As shown, the machine assessment service 1530 may be configured to interact with various agents executing on different clients 1510 and 1520 (e.g., a first client network 130a of FIG. 1, a second client network 130b of FIG. 1). The different clients may be different groups, organizations, companies, or other types of entities. In some embodiments, distinct clients 1510 and 1520 may be associated with a different user account of the machine assessment service 1530. As shown, the clients in this example may own different types of computing resources (e.g., first customer asset #1 145*a*, first customer asset #2 150*a*, first customer asset #3 155*a*, second customer asset #1 145*b*, second customer asset #2 150*b*, second customer asset #3 155*b*), such as a workstation 1510*a*, a server 1510*b*, a mobile device 1510*c*, and a virtual machine 1510*d*. The virtual machine 1510*d* may be an instance of an emulated computer that is hosted on a physical virtual machine host. The virtual machine host may implement virtualization hardware and/or software (e.g. hypervisors) to execute and manage multiple instances of guest operating systems. Example implementations of such virtualization technologies include VMWARE ESX/ESXI, MICROSOFT HYPERV, AMAZON WEB SERVICES, and MICROSOFT AZURE. As another example, another type of virtualized execution environment is the container, which provides a portable and isolated execution environment over a host operating system of a physical host. Example implementations of container technologies include DOCKER, GOOGLE KUBERNETES, AMAZON WEB SERVICES, and MICROSOFT AZURE. As may be appreciated, client machines 1510 may include other types of computing systems, including embedded systems, networking devices, storage devices, Internet-of-Things (IoT) devices, vehicles, and the like.

As shown, each of these types of machines or execution environments may be monitored by agents 1512*a-d* (e.g., scan assistant 125 of FIG. 1, scan assistant 210 of FIG. 2, scan assistant 210 of FIGS. 3A and 3B, scan assistant 410 of FIG. 4, assessment service device 540 of FIG. 5, scan assistant 550 of FIG. 5, scan assistant 610 of FIG. 6, scan assistant 710 of FIG. 7, scan assistant 1120 of FIG. 11) that collect machine characteristic data from the machines or execution environments. In some embodiments, the agents 1512 may be implemented as a lightweight software module on the client machines 1510. Different types of agents 1512 may be implemented for different machine platforms, such as WINDOWS, LINUX, or MAC machines. In some embodiments, the agent 1512 may be designed to run on a different computing system from the machine 1510 being monitored. In that case, the agent 1512 may be configured to establish network connections to the machine 1510 and collect machine characteristics data over these network connections.

As shown, the agents 1512 are configured to communicate with the machine assessment service 1530 over one or more networks 1525. In various embodiments, the network(s) 1525 may encompass any suitable combination of networking hardware and protocols necessary to establish communications between the agent 1512 and the machine assessment service 1530. In some embodiments, the machine 1510 may execute in a private network of a company, behind a company firewall, and the network 1525 may include a public network such as the Internet, which lies outside the firewall. The network 1525 may encompass the different telecommunications networks and service providers that collectively implement the Internet. In some embodiments, the network 1525 may also include private networks such as private local area networks (LANs), private wide area networks (WANs), or private wireless networks. The network 1525 may be implemented using different hardware (e.g., modems, routers, switches, load balancers, proxy servers, etc.) and software (e.g., protocol stacks, accounting software, firewall/security software, etc.) for establishing networking links between the client machines 1510 and the machine assessment service 1530.

As shown, the depicted system is implemented using client machines 1510*a-d*, and a machine assessment service 1530. In some embodiments, the depicted operations on the client machines 1510*a-d* may be performed by the agent 1512*a-d* executing on the client machine, which is configured to communicate with the machine assessment service 1530 over one or more networks 1525, to collect and report machine characteristics data about the client machines to the machine assessment service. In some embodiments, the machine assessment system 1530 may be implemented as a cloud-based or network-accessible service, which is configured to receive machine characteristics data from a large number of different client machines and perform security vulnerability assessments on remote machines based on the received data. In some embodiments, each collection agent on the client machines may be assigned a unique agent ID that identifies the agent to the machine assessment service.

As shown, the machine assessment service may include a number of services implemented on of the resources 1550 provided by the PaaS provider. As shown, the overall machine assessment system 1530 also includes an assessment service 1544, a database service 1543, and other services 1548. A data store or connection map may be hosted in the database service 1543. In some embodiments, the machine assessment service 1530 may provide the database service 1543 to store different snapshots being maintained by a collection process. The database service 1543 may be implemented on top of storage resources 1554 provided by the PaaS provider. For example, the PaaS provider may provide storage in the form of a database, a file system, or a volume hosted in the cloud. In some embodiments, the storage provided by the machine assessment service 1530 may be persistent storage. In some embodiments, the provided storage may not be guaranteed to be persistent, so that if the service is restarted, some of data may be lost. In some embodiments, the database service 1543 may be enhanced using a high-performance in-memory cache, which may be provided by the PaaS provider as a managed cluster of compute nodes, such as a REDIS cluster.

A machine assessment component may be implemented by an assessment service 1544. The assessment process may be conducted by an assessment orchestrator, which may invoke various types of assessments of the client machine. In some embodiments, the assessments may determine various security vulnerabilities of the client machine based on the collected machine characteristics. For example, an assessment may detect conditions such as the existence of malware signatures, missing application patches, incorrect or suspicious file permissions or locations, users with inappropriate access privileges, among other things. In some embodiments, the assessment service may observe and track these conditions over time, to determine a problematic or suspicious pattern of changes on the remote machine. The assessment service 1544 may then generate an assessment report that details any detected security vulnerabilities about the machine, which may be provided to the machine's owners via a user interface 1546.

As shown, the machine assessment service 1530 may also implement a user interface 1546, which may be a web-based graphical or command line user interface. The user interface 1546 can provide a data collection configuration interface, a client machine inspection interface, an assessment reporting interface, and/or an authenticated asset scanning management system interface. The client machine inspection interface may be used to examine the current state of the client machine. For example, the client machine inspection interface may allow users to navigate through the client machine's configurations and files, or issue queries against the configuration settings of the client machine. The assessment reporting interface may be used to provide results of machine assessments to users. In some embodiments, the assessment reporting interface may include a notification interface that pushes notifications to registered users, for example, via email or text, or to a client-side repository. The authenticated asset scanning management system interface can allow users to directly interact with computing resources 1510a-d by sending commands to one or more of the resources to be executed.

As shown, the machine assessment service 1530 may be implemented within a platform-as-a-service provider network, and the clients of the machine assessment service 1530 may convey service requests to and receive responses from the PaaS provider network via network 1525. In some embodiments, the service request and responses may be web services requests and responses and formatted as JSON documents. The machine assessment service 1530 may support REST-style or document-based (e.g., SOAP-based) types of web services requests. In some embodiments, the machine assessment service 1530 may implement service interfaces using other types of remote procedure calling protocols, such as GOOGLE PROTOCOL BUFFERS or PROTOBUF. The PaaS provider network may provide hardware and/or software to implement service endpoints, such that a request directed to that endpoint is properly received and processed.

As shown, the PaaS provider network may provide different types of computing resources 1550, which can be leased by service customers to implement custom hosted services. As shown, the PaaS provider may provide resource services such as compute resource service 1552, storage resource service 1554, networking resources service 1556, orchestration service 1558, and resource metrics service 1559. The services of the machine assessment service 1530 may be built using these underlying resource services provided by the PaaS provider. In some embodiments, the PaaS resources 1550 may implement features such as load balancing of incoming service requests and/or dynamic management and scaling of service node pools. In some embodiments, each of the services 1540, 1543, 1544, 1546, 1548, and the authenticated asset scanning management system 1560 may be implemented using a pool of service nodes provided by the PaaS provider, which may be individual instances of virtual machines. In some embodiments, the PaaS provider may be a provider such as AMAZON WEB SERVICES or MICROSOFT AZURE.

FIG. 16 is a block diagram of a computing system that may be used to implement one or more portions of a system for performing asset assessment according to some aspects. For example, computing system 1610 can be used to implement asset assessment as described herein. Computing system 1610 broadly represents a single or multi-processor computing device or system capable of executing computer-readable instructions. Examples of computing system 1610 include, without limitation, any one or more of a variety of devices including workstations, personal computers, laptops, client-side terminals, servers, distributed computing systems, handheld devices, network appliances, storage controllers, and the like. In one configuration, computing system 1610 may include at least one processor 1625 and a memory 1630. By executing the software that implements asset assessment, computing system 1610 becomes a special purpose computing device that is configured to perform asset assessment.

Processor 1625 generally represents any type or form of processing unit capable of processing data or interpreting and executing instructions. In certain embodiments, processor 1625 may receive instructions from a software application or module that may cause processor 1625 to perform the functions of one or more of the embodiments described and/or illustrated herein. For example, processor 1625 may perform and/or be a means for performing all or some of the operations described herein. Processor 1625 may also perform and/or be a means for performing any other operations, methods, or processes described and/or illustrated herein. Memory 1630 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments, computing system 1610 may include both a volatile memory unit and a non-volatile storage device. In one example, program instructions implementing asset assessment may be loaded into memory 1630.

In certain embodiments, computing system 1610 may also include one or more components or elements in addition to processor 1625 and/or memory 1630. For example, as shown, computing system 1610 may include a memory controller 1635, an Input/Output (I/O) controller 1640, and a communication interface 1650, each of which may be interconnected via a communication infrastructure. Communication infrastructure 1660 generally represents any type or form of infrastructure capable of facilitating communication between one or more components of a computing device. Examples of communication infrastructure 1660 include, without limitation, a communication bus (such as an Industry Standard Architecture (ISA), Peripheral Component Interconnect (PCI), PCI express (PCIe), or similar bus) and a network.

Memory controller 1635 generally represents any type/form of device capable of handling memory or data or controlling communication between one or more components of computing system 1610. In certain embodiments memory controller 1635 may control communication between processor 1625, memory 1630, and I/O controller 1640 via communication infrastructure 1660, and may perform and/or be a means for performing, either alone or in combination with other elements, one or more of the operations or features described and/or illustrated herein. I/O controller 1640 generally represents any type or form of module capable of coordinating and/or controlling the input and output functions of a computing device. For example, in certain embodiments I/O controller 1640 may control or facilitate transfer of data between one or more elements of computing system 1610, such as processor 1625, memory 1630, communication interface 1650, display adapter 1670, input interface 1680, and storage interface 1690.

Communication interface 1650 broadly represents any type/form of communication device/adapter capable of facilitating communication between computing system 1610 and other devices and may facilitate communication between computing system 1610 and a private or public network. Examples of communication interface 1650 include, a wired network interface (e.g., network interface card), a wireless network interface (e.g., a wireless network interface card), a modem, and any other suitable interface. Communication interface 1650 may provide a direct connection to a remote server via a direct link to a network, such as the Internet, and may also indirectly provide such a connection through, for example, a local area network. Communication interface 1650 may also represent a host adapter configured to facilitate communication between computing system 1610 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 1610 may also include at least one display device 1675 coupled to communication infrastructure 1660 via a display adapter 1670 that generally represents any type or form of device capable of visually displaying information forwarded by display adapter 1670. Display adapter 1670 generally represents any type or form of device configured to forward graphics, text, and other data from communication infrastructure 1660 (or from a frame buffer, as known in the art) for display on display device 1675. Computing system 1610 may also include at least one input device 1685 coupled to communication infrastructure 1660 via an input interface 1680. Input device 1685 generally represents any type or form of input device capable of providing input, either computer or human generated, to computing system 1610. Examples of input device 1685 include a keyboard, a pointing device, a speech recognition device, or any other input device.

Computing system 1610 may also include storage device 1695 coupled to communication infrastructure 1660 via a storage interface 1690. Storage device 1695 generally represents any type or form of storage devices or mediums capable of storing data and/or other computer-readable instructions. For example, storage device 1695 may include a magnetic disk drive (e.g., a so-called hard drive), a floppy disk drive, a magnetic tape drive, an optical disk drive, a flash drive, or the like. Storage interface 1690 generally represents any type or form of interface or device for transmitting data between storage device 1695, and other components of computing system 1610. Storage device 1695 may be configured to read from and/or write to a removable storage unit configured to store computer software, data, or other computer-readable information. Examples of suitable removable storage units include a floppy disk, a magnetic tape, an optical disk, a flash memory device, or the like. Storage device 1695 may also include other similar structures or devices for allowing computer software, data, or other computer-readable instructions to be loaded into computing system 1610. For example, storage device 1695 may be configured to read and write software, data, or other computer-readable information. Storage device 1695 may also be a part of computing system 1610 or may be separate devices accessed through other interface systems.

Many other devices or subsystems may be connected to computing system 1610. Conversely, all of the components and devices illustrated in the figure need not be present to practice the embodiments described and/or illustrated herein. The devices and subsystems referenced above may also be interconnected in different ways from that shown in the figure. Computing system 1610 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1610 for storage in memory via a network such as the Internet or upon a carrier medium.

The computer-readable medium containing the computer program may be loaded into computing system 1610. All or a portion of the computer program stored on the computer-readable medium may then be stored in memory 1630, and/or various portions of storage device 1695. When executed by processor 1625, a computer program loaded into computing system 1610 may cause processor 1625 to perform and/or be a means for performing the functions of one or more of the embodiments described/illustrated herein. Alternatively, one or more of the embodiments described and/or illustrated herein may be implemented in firmware and/or hardware.

Although the present disclosure is described in connection with a number of embodiments, the disclosure is not intended to be limited to the specific forms set forth herein. On the contrary, it is intended to cover such alternatives, modifications, and equivalents as can be reasonably included within the scope of the disclosure.

The following clauses describe certain embodiments of systems and methods taught in the present disclosure:

Clause 1. A method comprising:
  performing, by a scan assistant on an asset of a network:
    establishing a connection with a scan engine on a device having electronic communication with the asset, wherein the asset comprises at least one computing resource, wherein the scan engine is configured to use the scan assistant to perform scans of the asset based on a communication protocol, and wherein the scan assistant provides the scan engine access to perform the scans;
    receiving, from the scan engine, one or more scan operations to execute on the asset according to the communication protocol;
    executing the one or more scan operations on the asset to obtain results reflecting a state of the asset; and
    sending the results to the scan engine according to the communication protocol.

Clause 2. The method of Clause 1, wherein the connection is a transport layer security (TLS) connection established using TLS protocol.

Clause 3. The method of Clause 2, wherein the establishing of the TLS connection comprises:
  receiving a public certificate from the scan engine; and
  authenticating the scan engine to execute the one or more scan operations on the asset based on verifying the public certificate from the scan engine with a certificate authority stored on the asset.

Clause 4. The method of Clause 3, wherein the scan engine stores different pairs of public certificates and private keys associated with different assets, and the different pairs of public certificates and private keys are used to establish TLS connections with the different assets.

Clause 5. The method of Clause 3, further comprising the scan assistant:
  generating a second public certificate and a second private key pair associated with the scan assistant; and
  sending the second public certificate of the scan assistant to the scan engine as part of a two-way certificate authentication,
  wherein the second public certificate and second private key pair is generated when the asset is rebooted or the scan assistant is started as a service on the asset, and wherein the scan engine is configured to authenticate the scan assistant without verifying the second public certificate from the scan assistant with a second certificate authority.

Clause 6. The method of Clause 3, further comprising the scan assistant:

storing a signed second public certificate and a second private key pair on the asset; and sending the signed second public certificate to the scan engine;

wherein the scan engine is configured to authenticate the scan assistant based on verifying the signed second public certificate from the scan assistant with a second certificate authority stored on the scan engine.

Clause 7. The method of Clause 6, further comprising the scan engine:

receiving, from the scan assistant, the signed second public certificate; and verifying the scan assistant based on the signed second public certificate using the second certificate authority stored on the scan engine.

Clause 8. The method of Clause 7, wherein the scan engine is configured to use different certificate authorities to verify public certificates of different scan assistants.

Clause 9. The method of Clause 2, wherein the TLS connection is established using a one-way certificate authentication.

Clause 10. The method of Clause 2, wherein the TLS connection is established using a two-way certificate authentication.

Clause 11. The method of Clause 1, wherein the communication protocol is used by the scan engine to request data stored on the asset or query information about the asset.

Clause 12. The method of Clause 1, wherein the communication protocol is used by the scan engine to execute commands on the asset.

Clause 13. A system comprising:

a memory that stores program instructions; and one or more processor that executes the program instructions to implement a scan assistant on an asset, the scan assistant configured to:

establish a connection with a scan engine on a device having electronic communication with the asset, wherein the asset comprises at least one computing resource, wherein the scan engine is configured to use the scan assistant to perform scans of the asset based on a communication protocol, and wherein the scan assistant provides the scan engine access to perform the scans;

receive, from the scan engine, one or more scan operations to execute on the asset according to the communication protocol;

execute the one or more scan operations on the asset to obtain results reflecting a state of the asset; and send the results to the scan engine according to the communication protocol.

Clause 14. The system of Clause 13, wherein the connection is a transport layer security (TLS) connection established using TLS protocol.

Clause 15. The system of Clause 14, wherein to establish the TLS connection, the scan assistant is configured to:

receive a public certificate from the scan engine; and authenticate the scan engine to execute the one or more scan operations on the asset based on verifying the public certificate from the scan engine with a certificate authority stored on the asset.

Clause 16. The system of Clause 14, wherein the scan assistant is configured to:

generate a second public certificate and a second private key pair associated with the scan assistant; and send the second public certificate of the scan assistant to the scan engine as part of a two-way certificate authentication, wherein the second public certificate and second private key pair is generated when the asset is rebooted or the scan assistant is started as a service on the asset, and wherein the scan engine is configured to authenticate the scan assistant without verifying the second public certificate from the scan assistant with a second certificate authority.

Clause 17. The system of Clause 14, wherein the scan assistant is configured to:

store a signed second public certificate and a second private key pair on the asset; and send the signed second public certificate to the scan engine;

wherein the scan engine is configured to authenticate the scan assistant based on verifying the signed second public certificate from the scan assistant with a second certificate authority stored on the scan engine.

Clause 18. A non-transitory, computer-readable storage medium storing program instructions that when executed by one or more processors, cause the one or more processors to implement a scan assistant on an asset, the scan assistant configured to:

establish a connection with a scan engine on a device having electronic communication with the asset, wherein the asset comprises at least one computing resource, wherein the scan engine is configured to use the scan assistant to perform scans of the asset based on a communication protocol, and wherein the scan assistant provides the scan engine access to perform the scans;

receive, from the scan engine, one or more scan operations to execute on the asset according to the communication protocol;

execute the one or more scan operations on the asset to obtain results reflecting a state of the asset; and send the results to the scan engine according to the communication protocol.

Clause 19. The non-transitory, computer-readable storage medium of Clause 18, wherein the connection is a transport layer security (TLS) connection established using a one-way certificate authentication.

Clause 20. The non-transitory, computer-readable storage medium of Clause 18, wherein the connection is a transport layer security (TLS) connection established using a two-way certificate authentication.

Clause 21. A method comprising:

performing, by an asset comprising at least one computing resource in a network:

deploying a scan assistant on the asset, wherein the scan assistant is associated with a scan engine outside the network configured to perform scans of the asset to collect information about the asset, and the asset implements one or more policy benchmarks that prevents scans of the asset from outside the network;

executing the scan assistant on the asset to perform a scan of the asset, including: establishing a connection with the scan engine;

receiving one or more scan operations from the scan engine over the connection; and executing the one or more scan operations on the asset, wherein the connection bypasses the one or more policy benchmarks of the asset and does not rely on a policy exception in the one or more policy benchmarks.

Clause 22. The method of Clause 21, further comprising the scan assistant authenticating the scan engine prior to establishing the connection.

Clause 23. The method of Clause 21, wherein the connection is established by the scan assistant sending a request for connection to the scan engine.

Clause 24. The method of Clause 21, wherein the scan engine is implemented in a platform-as-a-service provider network accessible to the network via Internet.

Clause 25. The method of Clause 21, wherein:

the connection is a transport layer security (TLS) connection; and the one or more scan operations are received according to a communication protocol implemented by the scan assistant and the scan engine; and the method further comprises the scan assistant sending scan results of the scan back to the scan engine over the connection and according to the communication protocol.

Clause 26. The method of Clause 21, wherein the one or more policy benchmarks prohibits remote access to one or more services running the asset.

Clause 27. The method of Clause 21, wherein the one or more policy benchmarks prohibits remote access to the asset via an administrative credential.

Clause 28. The method of Clause 21, wherein the one or more policy benchmarks restricts permissions of remote connections to the asset, and the restriction prevents the one or more scan operations from executing.

Clause 29. The method of Clause 21, wherein the one or more scan operations comprise at least one of a command or a script executable on the asset.

Clause 30. A system comprising:

one or more computing devices that implement an asset in a network, configured to:

deploy a scan assistant on the asset, wherein the scan assistant is associated with a scan engine outside the network configured to perform scans of the asset to collect information about the asset, and the asset implements one or more policy benchmarks that prevents scans of the asset from outside the network;

execute the scan assistant on the asset to perform a scan of the asset, including to: establish a connection with the scan engine;

receive one or more scan operations from the scan engine over the connection; and execute the one or more scan operations on the asset, wherein the connection bypasses the one or more policy benchmarks of the asset and does not rely on a policy exception in the one or more policy benchmarks.

Clause 31. The system of Clause 30, wherein the scan assistant is configured to authenticate the scan engine prior to establishing the connection.

Clause 32. The system of Clause 30, wherein the scan assistant is configured to send a request for connection to the scan engine to establish the connection.

Clause 33. The system of Clause 30, wherein the scan engine is implemented in a platform-as-a-service provider network accessible to the network via Internet.

Clause 34. The system of Clause 30, wherein:

the connection is a transport layer security (TLS) connection; and the one or more scan operations are received according to a communication protocol implemented by the scan assistant and the scan engine; and the scan assistant is configured to send scan results of the scan back to the scan engine over the connection and according to the communication protocol.

Clause 35. The system of Clause 30, wherein the one or more policy benchmarks prohibits remote access to one or more services running the asset.

Clause 36. The system of Clause 30, wherein the one or more policy benchmarks prohibits remote access to the asset via an administrative credential.

Clause 37. The system of Clause 30, wherein the one or more policy benchmarks restricts permissions of remote connections to the asset, and the restriction prevents the one or more scan operations from executing.

Clause 38. One or more non-transitory computer readable media storing program instructions that when executed on one or more processors implement an asset in a network and cause the asset to:

deploy a scan assistant on the asset, wherein the scan assistant is associated with a scan engine outside the network configured to perform scans of the asset to collect information about the asset, and the asset implements one or more policy benchmarks that prevents scans of the asset from outside the network;

execute the scan assistant on the asset to perform a scan of the asset, including to: establish a connection with the scan engine;

receive one or more scan operations from the scan engine over the connection; and execute the one or more scan operations on the asset, wherein the connection bypasses the one or more policy benchmarks of the asset and does not rely on a policy exception in the one or more policy benchmarks.

Clause 39. The one or more non-transitory computer readable media of Clause 38, wherein the program instructions when executed on one or more processors causes the scan assistant to authenticate the scan engine prior to establishing the connection.

Clause 40. The one or more non-transitory computer readable media of Clause 38, wherein the program instructions when executed on one or more processors causes the scan assistant to send scan results of the scan back to the scan engine over the connection.

Clause 41. A method, comprising:

performing, by a scan assistant on an asset in a network:

receiving, from a scan engine remote from the asset, one or more scan operations to use during a scan of the asset wherein the asset comprises at least one computing resource;

verifying that the one or more scan operations are signed with a private key using a public key corresponding to the private key, wherein the public key is stored on the asset with the scan assistant;

subsequent to the verifying:

executing the one or more scan operations on the asset to obtain results reflecting a state of the asset; and sending the results to the scan engine.

Clause 42. The method of Clause 41, further comprising the scan assistant:
prior to receiving the one or more scan operations:
  authenticating the scan engine by verifying a client certificate sent by the scan engine with a certificate authority stored with the scan assistant; and
  establishing an encrypted connection with the scan engine in response to the authenticating;
wherein the one or more scan operations are received over the encrypted connection.

Clause 43. The method of Clause 41, wherein the public key is pinned in an executable binary of the scan assistant.

Clause 44. The method of Clause 41, wherein:
the one or more scan operations are part of a collection of commands executable by the asset; and
the commands are signed with the private key individually.

Clause 45. The method of Clause 41, wherein:
the one or more scan operations are part of a collection of commands executable by the asset; and
the collection is signed with the private key as a group.

Clause 46. The method of Clause 45, wherein:
the commands are stored in a key-value map that associates each command to a unique command identifier;
the key-value map is signed with the private key; and
the method further comprises the scan assistant looking up one or more commands in the key-value map using one or more command identifiers received from the scan engine.

Clause 47. The method of Clause 45, wherein the commands include:
an operating system command implemented by an operating system executing on the asset; or
a shell script command that invokes a shell script of multiple operating system commands on an operating system executed by the asset.

Clause 48. The method of Clause 45, wherein:
the collection of commands is received via one or more calls to an Application Programming Interface (API) of the scan assistant made by the scan engine; and
the method further comprises the scan assistant:
  loading command identifiers in the key-value map into memory subsequent to the verification; and
  receiving one or more additional calls via the API specifying the one or more command identifiers, the one or more command identifiers corresponding to one or more commands to be executed during the scan.

Clause 49. The method of Clause 48, further comprising the scan assistant:
receiving a second collection of commands from the scan engine to use for a second scan of the asset;
determining that the second collection cannot be verified with the public key, and in response:
  refraining from loading command identifiers in the second collection into memory so that the second collection of commands are not visible to the scan assistant during the second scan.

Clause 50. The method of Clause 49, further comprising the scan assistant:
responsive to an API call from the scan engine specifying a command identifier of a particular command in the second collection, returning an error message indicating that the particular command cannot be executed.

Clause 51. A system comprising:
an asset implemented by one or more computing devices in a network, wherein the asset implements a scan assistant configured to:
  receive, from a scan engine remote from the asset, one or more scan operations to use during a scan of the asset;
  verify that the one or more scan operations are signed with a private key using a public key corresponding to the private key, wherein the public key is stored on the asset with the scan assistant;
  subsequent to the verification:
    execute the one or more scan operations on the asset to obtain results reflecting a state of the asset; and
    send the results to the scan engine.

Clause 52. The system of Clause 51, wherein the scan assistant is configured to:
prior to receiving the one or more scan operations:
  authenticate the scan engine by verifying a client certificate sent by the scan engine with a certificate authority stored with the scan assistant; and
  establish an encrypted connection with the scan engine in response to the authenticating;
wherein the one or more scan operations are received over the encrypted connection.

Clause 53. The system of Clause 51, wherein the public key is pinned in an executable binary of the scan assistant.

Clause 54. The system of Clause 51, wherein:
the one or more scan operations are part of a collection of commands executable by the asset; and
the collection is signed with the private key as a group.

Clause 55. The system of Clause 54, wherein:
the commands are stored in a key-value map that associates each command to a unique command identifier;
the key-value map is signed with the private key; and
the scan assistant is configured to look up one or more commands in the key-value map using one or more command identifiers received from the scan engine.

Clause 56. The system of Clause 54, wherein the commands include:
an operating system command implemented by an operating system executing on the asset; of
a shell script command that invokes a shell script of multiple operating system commands on an operating system executed by the asset.

Clause 57. The system of Clause 54, wherein:
the collection of commands is received via one or more calls to an Application Programming Interface (API) of the scan assistant made by the scan engine; and
the scan engine is configured to:
  load command identifiers in the key-value map into memory subsequent to the verification; and
  receive one or more additional calls via the API specifying the one or more command identifiers, the one or more command identifiers corresponding to one or more commands to be executed during the scan.

Clause 58. The system of Clause 57, wherein the scan assistant is configured to:
receive a second collection of commands from the scan engine to use for a second scan of the asset;
determine that the second collection cannot be verified with the public key, and in response:
  refrain from loading command identifiers in the second collection into memory so that the second collection of commands are not visible to the scan assistant during the second scan.

Clause 59. One or more non-transitory computer-readable storage media storing program instructions that when executed on or across one or more processors implement a scan assistant on an asset comprising one or more computing devices in a network and cause the scan assistant to:
receive, from a scan engine remote from the asset, one or more scan operations to use during a scan of the asset;
verify that the one or more scan operations are signed with a private key using a public key corresponding to the private key, wherein the public key is stored on the asset with the scan assistant;
subsequent to the verification:
  execute the one or more scan operations on the asset to obtain results reflecting a state of the asset; and
  send the results to the scan engine.
Clause 60. The one or more non-transitory computer-readable storage media of Clause 59, wherein the program instructions when executed on or across the one or more processors cause the scan assistant to:
prior to receiving the one or more scan operations:
  authenticate the scan engine by verifying a client certificate sent by the scan engine with a certificate authority stored with the scan assistant; and
  establish an encrypted connection with the scan engine in response to the authenticating;
wherein the one or more scan operations are received over the encrypted connection.

What is claimed is:

1. A method comprising:
performing, by an asset comprising at least one computing resource in a network:
  deploying a scan assistant on the asset, wherein the scan assistant is associated with a scan engine outside the network configured to perform scans of the asset to collect information about the asset, and the asset is subject to one or more policy benchmarks of the network that prevents scans of the asset from outside the network;
  executing the scan assistant on the asset to perform a scan of the asset, including:
  authenticating the scan engine based on a scan engine certificate obtained from the scan engine;
  after authenticating the scan engine, establishing a connection with the scan engine;
  receiving a request to perform a scan of the asset from the scan engine over the connections wherein the scan includes one or more scan operations that uses an administrative credential of the asset; and
  executing the scan on the asset, wherein the execution bypasses the one or more policy benchmarks so that the one or more scan operations are performed to bypass requiring a remote authentication of the administrative credential and to bypass the need for applying a policy exception to the one or more policy benchmarks.

2. The method of claim 1, further comprising the scan assistant performing a two-way certificate authentication with the scan engine prior to establishing the connection.

3. The method of claim 1, wherein the connection is established by the scan assistant sending a request for connection to the scan engine.

4. The method of claim 1, wherein the scan engine is implemented in a platform-as-a-service provider network accessible to the network via Internet.

5. The method of claim 1, wherein:
the connection is a transport layer security (TLS) connection; and
the one or more scan operations are received according to a communication protocol implemented by the scan assistant and the scan engine; and
the method further comprises the scan assistant sending scan results of the scan back to the scan engine over the connection and according to the communication protocol.

6. The method of claim 1, wherein the one or more policy benchmarks prohibits remote access to one or more services running the asset.

7. The method of claim 1, wherein the one or more policy benchmarks are implemented by a gateway of the network and the execution of the scan assistant includes instructing the gateway to bypass the one or more security benchmarks for a duration of the one or more scan operations.

8. The method of claim 1, wherein the one or more policy benchmarks restricts permissions of remote connections to the asset, and the restriction prevents the one or more scan operations from executing.

9. The method of claim 1, wherein the one or more scan operations comprise at least one of a command or a script executable on the asset.

10. A system comprising:
one or more computing devices that implement an asset in a network, configured to:
  deploy a scan assistant on the asset, wherein the scan assistant is associated with a scan engine outside the network configured to perform scans of the asset to collect information about the asset, and the asset is subject to one or more policy benchmarks of the network that prevents scans of the asset from outside the network;
  execute the scan assistant on the asset to perform a scan of the asset, including to:
  authenticate the scan engine based on a scan engine certificate obtained from the scan engine;
  after the scan engine is authenticated, establish a connection with the scan engine;
  receive a request to perform a scan of the asset from the scan engine over the connections wherein the scan includes one or more scan operations that uses an administrative credential of the asset; and
  execute the scan on the asset, wherein the execution bypasses the one or more policy benchmarks so that the one or more scan operations are performed to bypass requiring a remote authentication of the administrative credential and to bypass the need for applying a policy exception to the one or more policy benchmarks.

11. The system of claim 10, wherein the scan assistant is configured to perform a two-way certificate authentication with the scan engine prior to establishing the connection.

12. The system of claim 10, wherein the scan assistant is configured to send a request for connection to the scan engine to establish the connection.

13. The system of claim 10, wherein the scan engine is implemented in a platform-as-a-service provider network accessible to the network via Internet.

14. The system of claim 10, wherein:
the connection is a transport layer security (TLS) connection; and
the one or more scan operations are received according to a communication protocol implemented by the scan assistant and the scan engine; and the scan assistant is configured to send scan results of the scan back to the scan engine over the connection and according to the communication protocol.

15. The system of claim 10, wherein the one or more policy benchmarks prohibits remote access to one or more services running the asset.

16. The system of claim 10, wherein the one or more policy benchmarks are implemented by a gateway of the network and the execution of the scan assistant includes to instruct the gateway to bypass the one or more security benchmarks for a duration of the one or more scan operations.

17. The system of claim 10, wherein the one or more policy benchmarks restricts permissions of remote connections to the asset, and the restriction prevents the one or more scan operations from executing.

18. One or more non-transitory computer readable media storing program instructions that when executed on one or more processors implement an asset in a network and cause the asset to:
- deploy a scan assistant on the asset, wherein the scan assistant is associated with a scan engine outside the network configured to perform scans of the asset to collect information about the asset, and the asset is subject to one or more policy benchmarks of the network that prevents scans of the asset from outside the network;
- execute the scan assistant on the asset to perform a scan of the asset, including to:
  - authenticate the scan engine based on a scan engine certificate obtained from the scan engine;
  - after the scan engine is authenticated, establish a connection with the scan engine;
  - receive a request to perform a scan of the asset from the scan engine over the connection, wherein the scan includes one or more scan operations that uses an administrative credential of the asset; and
  - execute the scan on the asset, wherein the execution bypasses the one or more policy benchmarks so that the one or more scan operations are performed to bypass requiring a remote authentication of the administrative credential and to bypass the need for applying a policy exception to the one or more policy benchmarks.

19. The one or more non-transitory computer readable media of claim 18, wherein the program instructions when executed on one or more processors causes the scan assistant to perform a two-way certificate authentication with the scan engine prior to establishing the connection.

20. The one or more non-transitory computer readable media of claim 18, wherein the program instructions when executed on one or more processors causes the scan assistant to send scan results of the scan back to the scan engine over the connection.

* * * * *